United States Patent
Jackson, Jr.

(10) Patent No.: US 9,969,412 B2
(45) Date of Patent: May 15, 2018

(54) EXPEDITION CARTS AND ASSOCIATED METHODS

(71) Applicant: Thomas Joseph Jackson, Jr., Ringoes, NJ (US)

(72) Inventor: Thomas Joseph Jackson, Jr., Ringoes, NJ (US)

(73) Assignee: McClellan Butte, LLC, Rosemont, NJ (US)

(*) Notice: Subject to any disclaimer, the term of this patent is extended or adjusted under 35 U.S.C. 154(b) by 0 days. days.

(21) Appl. No.: 15/217,051

(22) Filed: Jul. 22, 2016

(65) Prior Publication Data

US 2016/0325771 A1   Nov. 10, 2016

Related U.S. Application Data

(63) Continuation-in-part of application No. 14/330,929, filed on Jul. 14, 2014, now Pat. No. 9,409,584.

(60) Provisional application No. 61/845,986, filed on Jul. 13, 2013.

(51) Int. Cl.
| | |
|---|---|
| B60B 1/00 | (2006.01) |
| B60B 1/02 | (2006.01) |
| B60B 1/04 | (2006.01) |
| B60B 1/10 | (2006.01) |
| B62B 1/18 | (2006.01) |
| B62B 5/06 | (2006.01) |
| B62B 1/12 | (2006.01) |

(52) U.S. Cl.
CPC .................. *B62B 1/18* (2013.01); *B62B 1/12* (2013.01); *B62B 1/125* (2013.01); *B62B 5/067* (2013.01); *B62B 5/068* (2013.01); *Y10T 29/49622* (2015.01)

(58) Field of Classification Search
CPC .... B60B 1/00; B60B 1/02; B60B 1/04; B60B 1/10; B60B 1/12; B60B 1/18; B60B 1/20
See application file for complete search history.

(56) References Cited

U.S. PATENT DOCUMENTS

| 570,444 A | 11/1896 | Armstrong |
| 2,559,981 A | 7/1951 | McBride |
| 3,856,191 A | 12/1974 | Pohl |
| 4,045,040 A | 8/1977 | Fails |

(Continued)

OTHER PUBLICATIONS

Expedition Carts, Armadilling: An Open Source Project on Man Hauled Carts (2014), available at http://www.armadilling.com/trailers-carts-sledges/.

(Continued)

*Primary Examiner* — Bryan A Evans
(74) *Attorney, Agent, or Firm* — McCarter & English, LLP

(57) ABSTRACT

Exemplary embodiments of an expedition cart are provided. The expedition cart includes a chassis configured and dimensioned to support a load. The expedition cart includes first and second gusset plates attached to the chassis. Each of the first and second gusset plates includes a central body portion and curved fastening edges on either side of the central body portion. The curved fastening edges can be configured and dimensioned to mate against at least a portion of the chassis. Exemplary embodiments of an expedition cart are also provided that include first and second hubs engaged with the chassis, the first and second hubs defining either a single part or a two part design.

21 Claims, 16 Drawing Sheets

(56) References Cited

U.S. PATENT DOCUMENTS

| | | |
|---|---|---|
| 4,429,897 A | 2/1984 | Friedman et al. |
| 4,588,197 A | 5/1986 | Benedetto, Jr. |
| 4,981,412 A | 1/1991 | Hawkins |
| 5,090,368 A | 2/1992 | Berghoefer |
| 5,330,212 A | 7/1994 | Garnder |
| 5,385,355 A | 1/1995 | Hoffman |
| 5,482,304 A | 1/1996 | Smith |
| 5,511,802 A | 4/1996 | Aitken |
| 5,526,894 A | 6/1996 | Wang |
| 5,586,778 A | 12/1996 | Lindh et al. |
| 5,607,170 A | 3/1997 | Capjon et al. |
| 5,622,294 A | 4/1997 | Evans |
| 5,673,928 A | 10/1997 | Jury |
| 5,687,978 A | 11/1997 | Rhodes et al. |
| 5,735,538 A | 4/1998 | Mosher et al. |
| 5,749,588 A | 5/1998 | Stallbaumer |
| 5,788,261 A | 8/1998 | Wu |
| 5,803,471 A | 9/1998 | DeMars et al. |
| 5,806,868 A | 9/1998 | Collins |
| 5,887,676 A | 3/1999 | Harbin |
| 5,887,879 A | 3/1999 | Chumley |
| 5,901,968 A | 5/1999 | Niedersteiner |
| 5,947,492 A | 9/1999 | Hallberg, Jr. |
| 5,975,543 A | 11/1999 | Mosher et al. |
| 5,984,327 A | 11/1999 | Hsieh et al. |
| 6,003,884 A | 12/1999 | Chang |
| 6,027,001 A | 2/2000 | Levitan |
| 6,039,333 A | 3/2000 | Hamblin |
| 6,053,516 A | 4/2000 | Ottaway |
| 6,070,906 A | 6/2000 | Allen |
| 6,092,817 A | 7/2000 | Kilmer |
| 6,120,042 A | 9/2000 | Mosher et al. |
| 6,139,033 A | 10/2000 | Western |
| 6,161,850 A | 12/2000 | James et al. |
| 6,164,672 A | 12/2000 | Hansen |
| 6,164,683 A | 12/2000 | Kalman |
| 6,193,264 B1 | 2/2001 | Seim |
| 6,196,561 B1 | 3/2001 | Trassinelli |
| 6,217,043 B1 | 4/2001 | Chumley |
| 6,260,864 B1 | 7/2001 | Smith |
| 6,302,430 B1 | 10/2001 | Wu |
| 6,308,968 B1 | 10/2001 | Hollingsworth |
| 6,332,620 B1 | 12/2001 | Mosher et al. |
| 6,334,622 B1 | 1/2002 | Romero |
| 6,341,787 B1 | 1/2002 | Mason |
| 6,349,949 B1 | 2/2002 | Gorringe |
| 6,352,269 B1 | 3/2002 | Chinigo |
| 6,382,642 B1 | 5/2002 | Rainey |
| 6,425,599 B1 | 7/2002 | Tsai |
| 6,431,556 B1 | 8/2002 | Beardsley et al. |
| 6,565,103 B2 | 5/2003 | Wilsori |
| 6,575,482 B2 | 6/2003 | Dombioskie et al. |
| 6,575,483 B1 | 6/2003 | Davis |
| 6,575,690 B1 | 6/2003 | Ansotegui |
| 6,685,198 B1 | 2/2004 | Hartman |
| 6,685,214 B2 | 2/2004 | Gregory |
| 6,688,635 B1 | 2/2004 | Watts |
| 6,698,811 B1 | 3/2004 | Schuchman |
| 6,733,016 B2 | 5/2004 | Chung |
| 6,789,808 B2 | 9/2004 | Yang |
| 6,796,564 B2 | 9/2004 | Kelly |
| 6,805,269 B2 | 10/2004 | Lockard |
| 6,837,502 B1 | 1/2005 | Lee |
| 6,935,643 B1 | 8/2005 | Purpuro |
| 6,942,228 B2 | 9/2005 | Bunce et al. |
| 6,962,353 B1 | 11/2005 | Garcia |
| 6,978,485 B2 | 12/2005 | Snide |
| 6,991,250 B2 | 1/2006 | Lindsey et al. |
| 7,004,495 B2 | 2/2006 | Thurm |
| 7,007,956 B1 | 3/2006 | Pinon |
| 7,017,939 B2 | 3/2006 | Darling, III |
| 7,036,832 B2 | 5/2006 | Gargaro |
| 7,063,340 B1 | 6/2006 | Wu |
| 7,111,851 B2 | 9/2006 | Duncan |
| 7,114,731 B2 | 10/2006 | Malrick |
| 7,172,207 B2 | 2/2007 | Henry |
| 7,175,188 B2 | 2/2007 | Joncourt |
| 7,246,802 B2 | 7/2007 | Yeung |
| 7,258,362 B2 | 8/2007 | Thurm |
| 7,311,313 B1 | 12/2007 | Ray et al. |
| 7,332,584 B2 | 2/2008 | Grasso et al. |
| 7,387,306 B2 | 6/2008 | Zimmer |
| 7,416,195 B2 | 8/2008 | Zwack |
| 7,442,223 B2 | 10/2008 | Rohrbach et al. |
| 7,484,737 B2 | 2/2009 | Satorius |
| 7,549,648 B2 | 6/2009 | Girard et al. |
| 7,600,764 B1 | 10/2009 | Parker |
| 7,611,161 B2 | 11/2009 | Gross |
| 7,651,104 B1 | 1/2010 | Hilt |
| 7,661,683 B2 | 2/2010 | Fernandez |
| 7,677,591 B2 | 3/2010 | Chapman |
| 7,726,670 B2 | 6/2010 | Manus |
| 7,762,561 B2 | 7/2010 | Clan |
| 7,793,744 B1 | 9/2010 | Hardie |
| 7,938,409 B2 | 5/2011 | Mejia |
| 8,056,781 B1 | 11/2011 | Rowe |
| 8,091,899 B2 | 1/2012 | Mejia |
| 8,100,816 B2 | 1/2012 | Daniel |
| 8,141,887 B1 | 3/2012 | Poteat |
| 8,162,348 B2 | 4/2012 | Thomas |
| 8,267,409 B2 | 9/2012 | Gross |
| 8,376,391 B2 | 2/2013 | Voves |
| 8,424,899 B1 | 4/2013 | Larson |
| 8,695,992 B2 | 4/2014 | Piaget et al. |
| 8,789,770 B2 | 7/2014 | Johnson |
| 8,833,776 B2 | 9/2014 | Boulanger et al. |
| 8,893,937 B1 | 11/2014 | Bristol |
| 8,967,557 B2 | 3/2015 | Struck, II |
| 8,979,095 B2 | 3/2015 | Lewis |
| 2001/0040350 A1 | 11/2001 | Allen et al. |
| 2002/0089134 A1 | 7/2002 | Salzbeiger et al. |
| 2003/0080538 A1 | 5/2003 | Watts et al. |
| 2003/0127476 A1 | 7/2003 | Lockard |
| 2004/0016781 A1 | 1/2004 | Smith |
| 2004/0150175 A1 | 8/2004 | Cepull |
| 2004/0155435 A1 | 8/2004 | Wails |
| 2004/0188963 A1 | 9/2004 | Gain |
| 2005/0077705 A1 | 4/2005 | Malrick |
| 2005/0115998 A1 | 6/2005 | Swenson |
| 2006/0055128 A1 | 3/2006 | Scott et al. |
| 2006/0120277 A1 | 6/2006 | Katz |
| 2006/0151963 A1 | 7/2006 | Epley |
| 2006/0196901 A1 | 9/2006 | Benk |
| 2007/0063467 A1 | 3/2007 | Hurtgam |
| 2007/0063468 A1 | 3/2007 | Hurtgam |
| 2007/0075105 A1 | 4/2007 | Petrin |
| 2007/0187910 A1 | 8/2007 | Adams |
| 2007/0252357 A1 | 11/2007 | Hoskins |
| 2008/0018063 A1 | 1/2008 | Morowat |
| 2008/0174078 A1 | 7/2008 | Dooley |
| 2008/0238024 A1 | 10/2008 | Heidenreich et al. |
| 2008/0296326 A1 | 12/2008 | Berlin et al. |
| 2008/0296851 A1 | 12/2008 | Hall |
| 2009/0057355 A1 | 3/2009 | Weiss |
| 2009/0079144 A1 | 3/2009 | Satorius |
| 2011/0062196 A1 | 3/2011 | Weiss |
| 2013/0048685 A1 | 2/2013 | Durkos |
| 2013/0341878 A1* | 12/2013 | Harris ............... B62B 1/12 280/30 |
| 2014/0008402 A1 | 1/2014 | Dickson |
| 2014/0265167 A1 | 9/2014 | Mejia |
| 2015/0091275 A1 | 4/2015 | Jordan |

OTHER PUBLICATIONS

PCT International Search Report and Written Opinion dated Nov. 10, 2014 for International Application No. PCTIUS2014;046547.

U.S. Appl. No. 14/330,929, filed Jul. 14, 2014, U.S. Pat. No. 9,409,584.

* cited by examiner

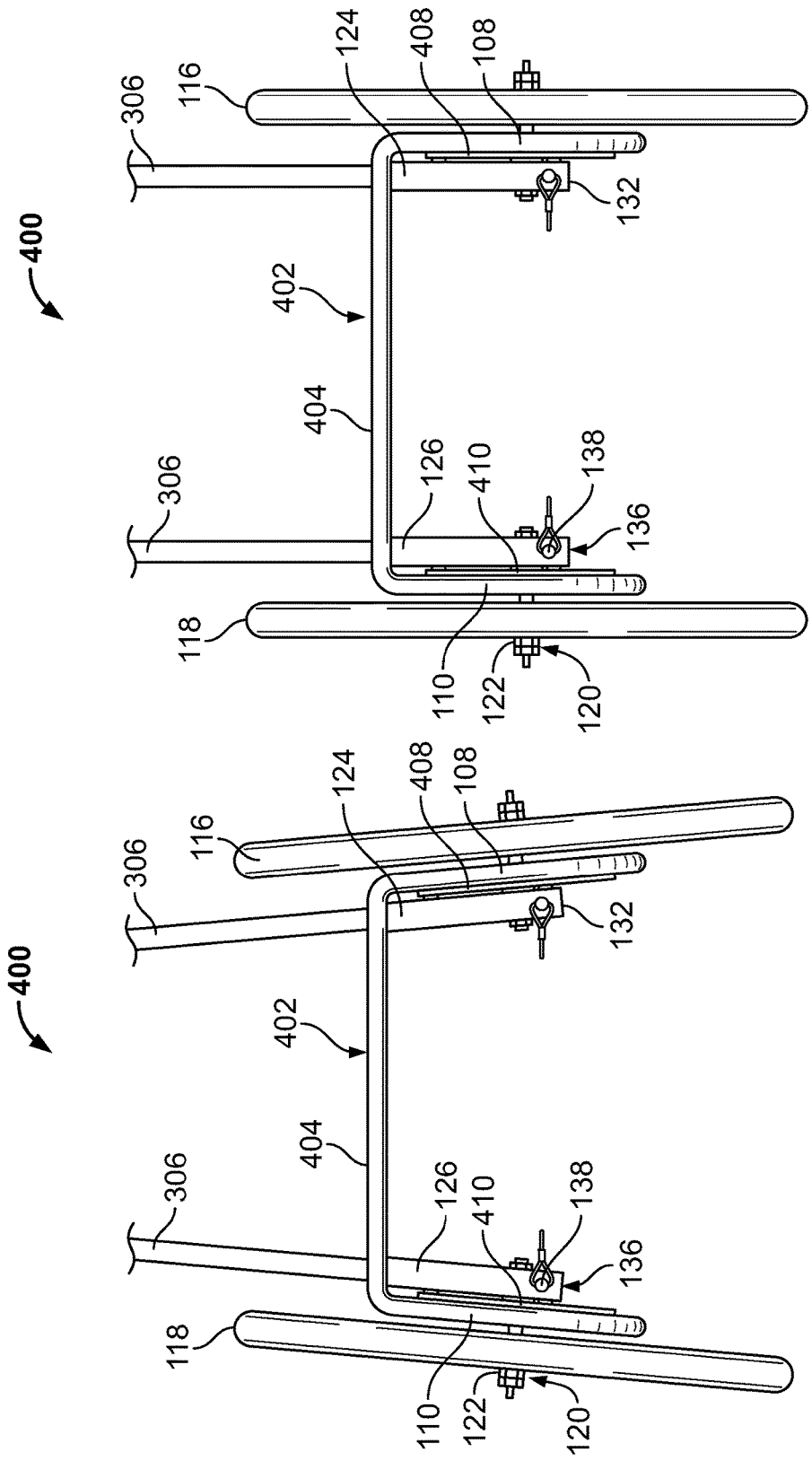

EXPEDITION CARTS AND ASSOCIATED METHODS

CROSS-REFERENCE TO RELATED APPLICATIONS

This application is a continuation-in-part application that claims the benefit of a co-pending, U.S. Non-Provisional patent application Ser. No. 14/330,929, which was filed on Jul. 14, 2014, which claims the benefit of U.S. Provisional Patent Application No. 61/845,986, which was filed on Jul. 13, 2013. The entire content of the foregoing patent applications is incorporated herein by reference.

TECHNICAL FIELD

The present invention generally relates to lightweight expedition carts for use in carrying supplies over outdoor terrains and, in particular, to expedition carts which are capable of being customized based on user characteristics or a user activity, and including components for enhanced load and force distribution, sleeve mounting, and hub reinforcement.

BACKGROUND

Expeditions are a function of distance, load, time, terrain, and packed gear. Regardless of the destination, be it mountaintop or ocean shore, the most grueling aspect of outdoor expeditions is not the distance, but rather the burden carried. Shouldered loads arrest or abort more expeditions than blistered toes. One method of carrying loads during long distance expedition trips is to pack items in a backpack and wear the backpack on one's body. However, over time, this can cause physical injury to a person's back, hip, legs, or feet.

Thus, a need exists for a means of carrying loads during an expedition over a variety of terrains which reduce the weight supported by the person and reduce the risk of injury to the person. These and other needs are addressed by the expedition carts and associated systems and methods of the present disclosure.

SUMMARY

In accordance with embodiments of the present disclosure, exemplary expedition carts, e.g., pull carts, are provided that allow a person to carry heavy loads during an expedition over a variety of terrains or landscapes for long distances. The expedition carts can be fabricated of sturdy materials which allow the expedition cart to endure virtually any terrain encountered throughout extended epics of travel. Use of an expedition cart to carry expedition equipment and supplies can alleviate or eliminate the problems associated with an expedition. The expedition cart can be easily and effectively pulled and maneuvered over a variety of terrains, including rough terrains. In addition, due to the lightweight structure of the expedition cart, the user can disassemble, store and carry the expedition cart when the terrain becomes unsuitable for use of the expedition cart or pulling the expedition cart becomes impractical, e.g., during very steep inclines and declines, extremely muddy terrain, river crossings, and the like. The expedition cart can be fabricated from lightweight materials, resulting in a lightweight expedition cart, yet strong enough to endure rough use. The exemplary expedition cart can therefore be easily maneuvered and can be disassembled and carried by a user when desired.

In accordance with embodiments of the present disclosure, exemplary expedition carts are provided that include a chassis configured and dimensioned to support a load. The expedition carts include first and second gusset plates secured to the chassis. The expedition carts further include a first sleeve mounted to the first gusset plate and a second sleeve mounted to the second gusset plate. The first sleeve can be configured and dimensioned to releasably receive therein at least a portion of a first shaft arm. The second sleeve can be configured and dimensioned to releasably receive therein at least a portion of a second shaft arm.

In some embodiments, the first and second shaft arms can be telescoping. In such embodiments, each of the first and second shaft arms can include a first tubular member and a second tubular member. The second tubular member can be configured to translate within the first tubular member.

The chassis can include a pair of substantially horizontal segments joined by a pair of side segments. The chassis can be fabricated from, e.g., a higher quality aluminum tubing, titanium tubing, carbon, and the like. In some embodiments, one or more sections of the horizontal segments can be wrapped or can include insulating foam or rubber tubing which can cushion the load on the expedition cart, dampen stresses, and add a frictional coefficient to reduce the hazard of load slippage. The pair of side segments can be V-shaped. In some embodiments, the pair of side segments can be outwardly splayed or angled relative to the pair of horizontal segments. First and second wheels mounted to the pair of side segments can be outwardly splayed relative to the pair of horizontal segments, thereby providing greater stability to the expedition cart. It should be understood that outwardly splayed refers to the wheels being positioned closer relative to each other at the top surfaces of the wheels and further apart relative to each other at the bottom or ground-contacting surface of the wheels. The first and second wheels can be mounted to the chassis by two separate and aligned hub bolts. In splayed wheel embodiments, the hub bolts for the wheels can be angled relative to each other.

In some embodiments, the first and second sleeves can be fixedly mounted to the first and second gusset plates, respectively. In some embodiments, the first and second sleeves can be pivotally or adjustably mounted to the first and second gusset plates, respectively. Pivoting the first and second sleeves relative to the first and second gusset plates can vary an angle of inclination of the first and second shaft arms relative to the first and second gusset plates and the chassis. An adjustment of the angle of inclination of the first and second shaft arms allows customization of the expedition cart to ensure that the loading deck defined by the horizontal segments of the chassis can be substantially level during trekking on level ground. Each of the first and second sleeves includes a pivot point and a locking mechanism, e.g., a spring-loaded pin. The first and second gusset plates can include a plurality of radially spaced holes. Each of the plurality of radially spaced holes can be configured and dimensioned to receive the locking mechanism of the first and second sleeves.

In some embodiments, the first and second shaft arms can include a flattened distal portion. The flattened distal portion can include a bore, e.g., a center bore, extending therethrough. The flattened distal portion and the bore of each of the first and second shaft arms can be configured to be received by and interlock relative to an interlocking mechanism of a belt or harness worn by a user.

In some embodiments, each of the first and second shaft arms can be at least partially filled with a dampening material, e.g., a core rod of plastic, to absorb and dampen impact stresses. Each of the first and second shaft arms can include a bracket, e.g., a spring-loaded clip, mounted thereon near a distal end. The bracket can be configured and dimensioned to releasably receive an elongated structure, e.g., a walking stick, therein. The elongated structure can be used to push and/or pull the expedition cart.

In accordance with embodiments of the present disclosure, exemplary expedition cart systems are provided that include an expedition cart as described herein. The systems further include a belt or harness to be worn by a user. The belt or harness can include a pair of interlocking mechanisms which can be configured and dimensioned to releasably interlock the flattened portion of the first and second shaft arms therein. Thus, rather than gripping and pulling the expedition cart, the expedition cart can be pulled through the belt or harness of the user.

In accordance with embodiments of the present disclosure, exemplary methods of assembling an expedition cart are provided that include providing an expedition cart as described herein. The methods include releasably securing at least a portion of a first shaft arm within the first sleeve and releasably securing at least a portion of a second shaft arm within the second sleeve. In some embodiments, the methods include pivoting the first and second sleeves to vary an angle of inclination of the first and second shaft arms relative to the first and second gusset plates and the chassis. The expedition cart can thereby be customized based on user characteristics (e.g., height), the type of activity for which the expedition cart will be used, user preferences, and the like.

In accordance with embodiments of the present disclosure, an exemplary expedition cart is provided that includes a chassis and first and second gusset plates. The chassis can be configured and dimensioned to support a load. The first and second gusset plates can be attached to the chassis. Each of the first and second gusset plates can include a central body portion and curved fastening edges on either side of the central body portion. The curved fastening edges can be configured and dimensioned to mate, wrap or snap around at least a portion of the chassis.

The central body portion can define a planar configuration. The curved fastening edges can extend substantially perpendicularly relative to a plane defined by the central body portion. The curved fastening edges can include curved inner mating surfaces configured complementary to the chassis. The curved fastening edges mated against (e.g., positioned against, wrapped at least partially around, snapped at least partially around, or the like) at least a portion of the chassis distribute forces imparted on the chassis to the first and second gusset plates along the mating surfaces.

In some embodiments, the expedition cart includes a hub secured to a valley portion of the chassis (e.g., the curved transition along the V-shaped or L-shaped side segments of the chassis). In some embodiments, the hub can define a two part design including a first half and a second half configured to be positioned around respective sides of the valley portion of the chassis. The first and second halves of the hub can include a semicircular passage extending between side edges of the first and second halves. The semicircular passage can be configured and dimensioned to receive respective halves of the valley portion of the chassis. The hub can include a central bore extending perpendicularly relative to the semicircular passage, and extending through the semicircular passage of the first and second halves.

In some embodiments, the hub can define a single part design including a body with two separate passages at opposing sides of the body. The two separate passages can be configured and dimensioned to receive endpoints of respective first and second halves of the chassis. The hub can include a central bore extending perpendicularly relative to the two separate passages without extending through the two separate passages.

In accordance with embodiments of the present disclosure, an exemplary expedition cart is provided that includes a chassis and first and second hubs. The chassis can be configured and dimensioned to support a load. The first and second hubs can be engaged with the chassis. Each of the first and second hubs can include a first half and a second half configured to be positioned around respective sides of the chassis.

In some embodiments, the first and second hub can each define a two part design. The first and second halves of each of the first and second hubs can include a semicircular passage extending between side edges of the first and second halves. The semicircular passage can be configured and dimensioned to receive respective halves of the chassis. Each of the first and second hubs can include a central bore extending perpendicularly relative to the semicircular passage, and extending through the semicircular passage of the first and second halves.

In accordance with embodiments of the present disclosure, an exemplary expedition cart is provided that includes a chassis and first and second hubs. The chassis can be configured and dimensioned to support a load. The first and second hubs can be engaged with the chassis. Each of the first hub and the second hub can include a body with two separate passages at opposing sides of the body. The two separate passages can be configured and dimensioned to receive endpoints of respective first and second halves of the chassis.

In some embodiments, the hub can define a single part design. Each of the first and second hubs can include a central bore extending through the hub perpendicularly relative to the two separate passages without extending through the two separate passages. In some embodiments, the two separate passages can extend at an angle greater than zero degrees relative to horizontal.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed expedition carts and associated systems and methods, reference is made to the accompanying figures, wherein:

FIG. 14 is a detailed, front view of an exemplary chassis according to the present disclosure;

FIG. 15 is a detailed, front view of an exemplary chassis according to the present disclosure;

DESCRIPTION OF EXEMPLARY EMBODIMENTS

Figure 1:
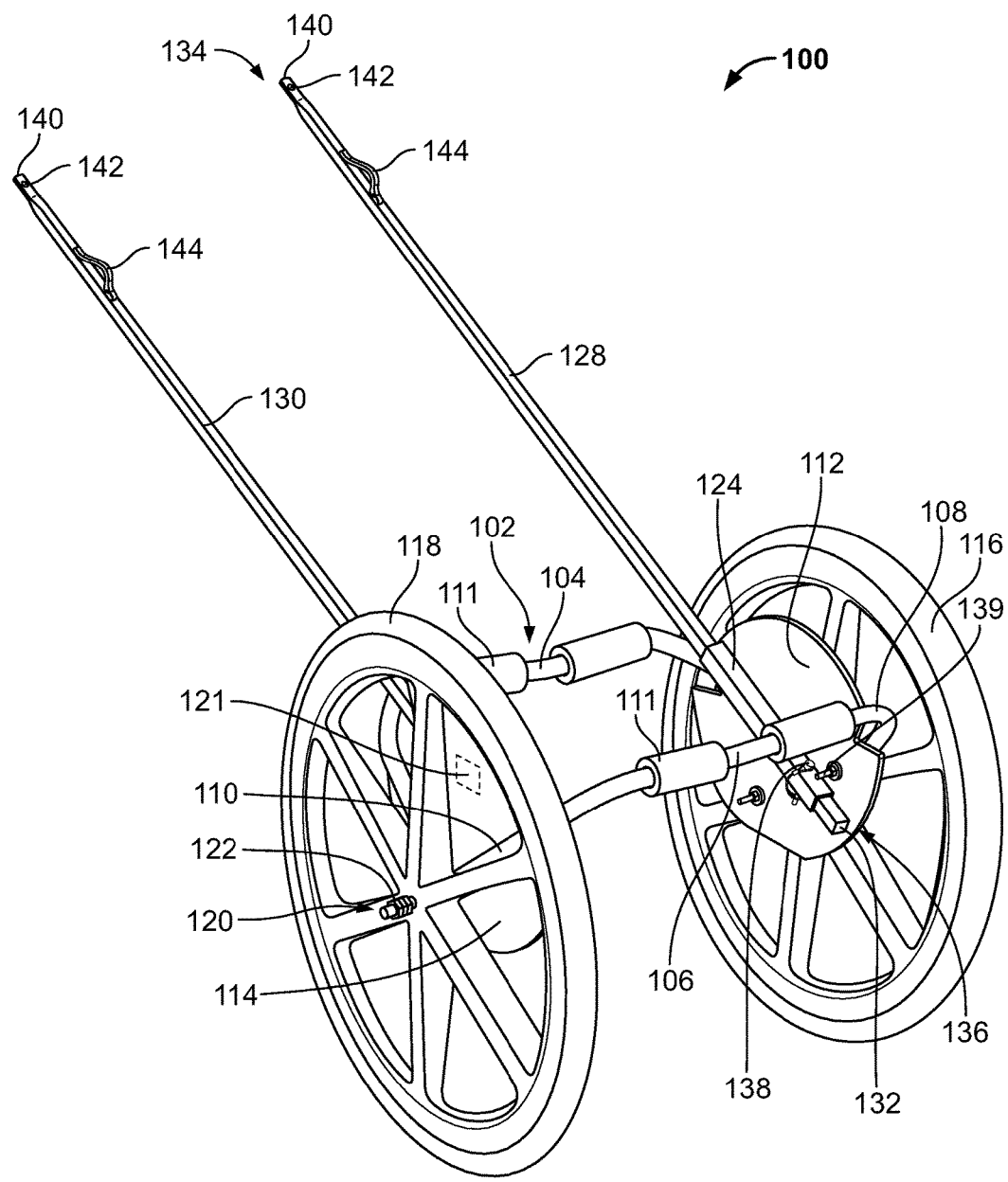
FIG. 1 is a perspective, front view of an exemplary expedition cart according to the present disclosure.
Figure 2:
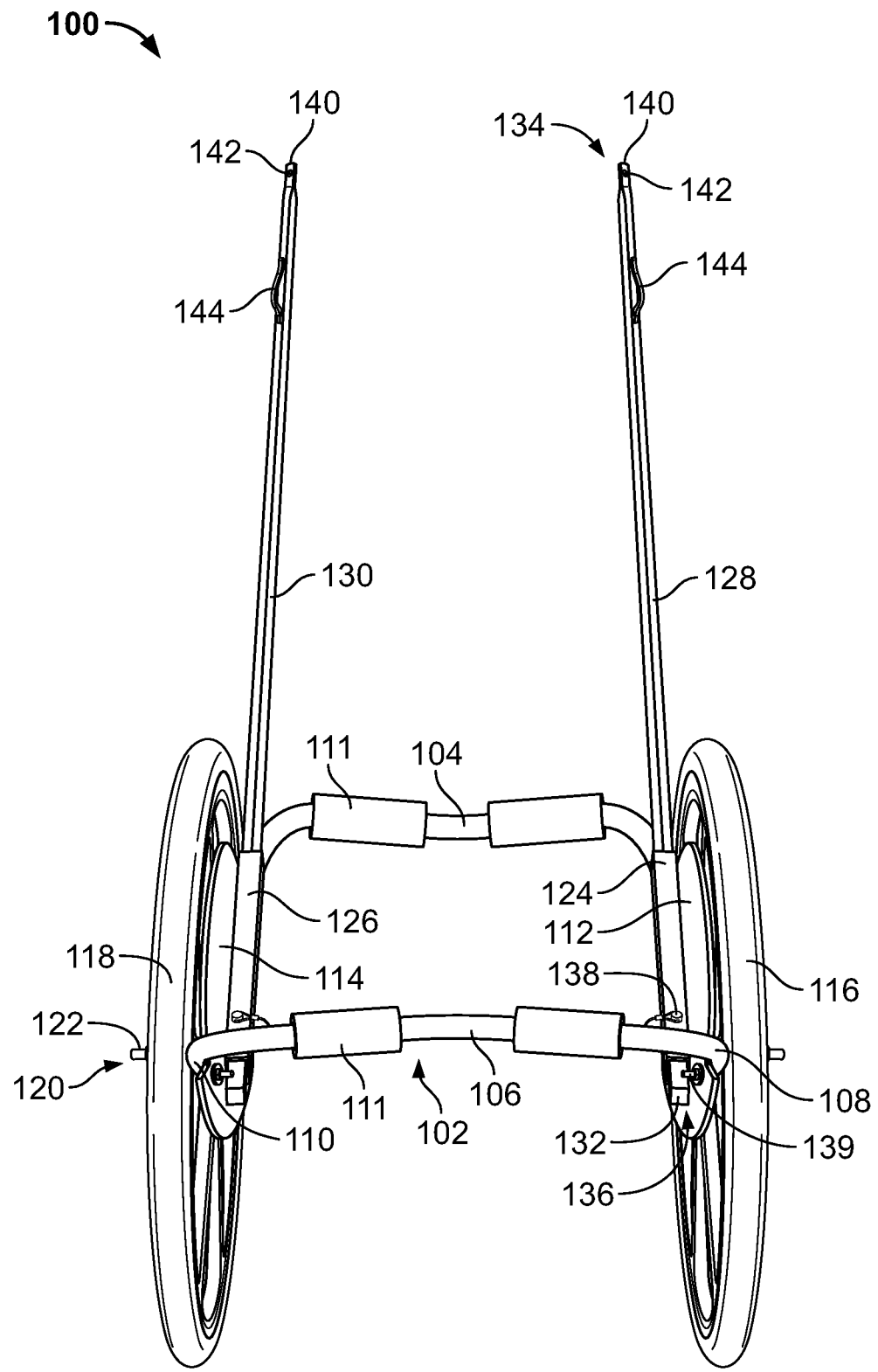
FIG. 2 is a front view of the exemplary expedition cart of FIG. 1.
Figure 3:
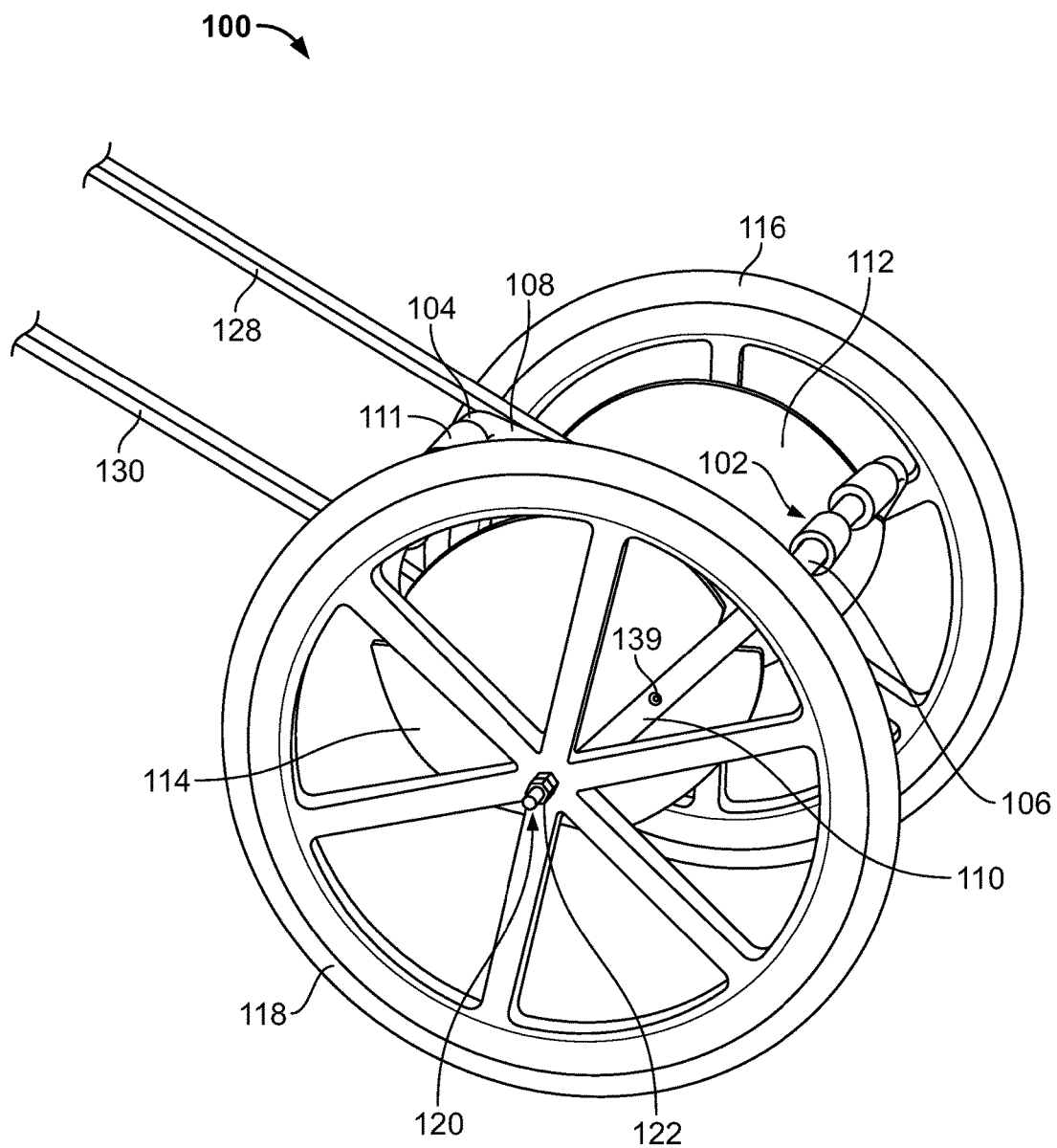
FIG. 3 is a detailed, side view of the exemplary expedition cart of FIG. 1.
Figure 4:
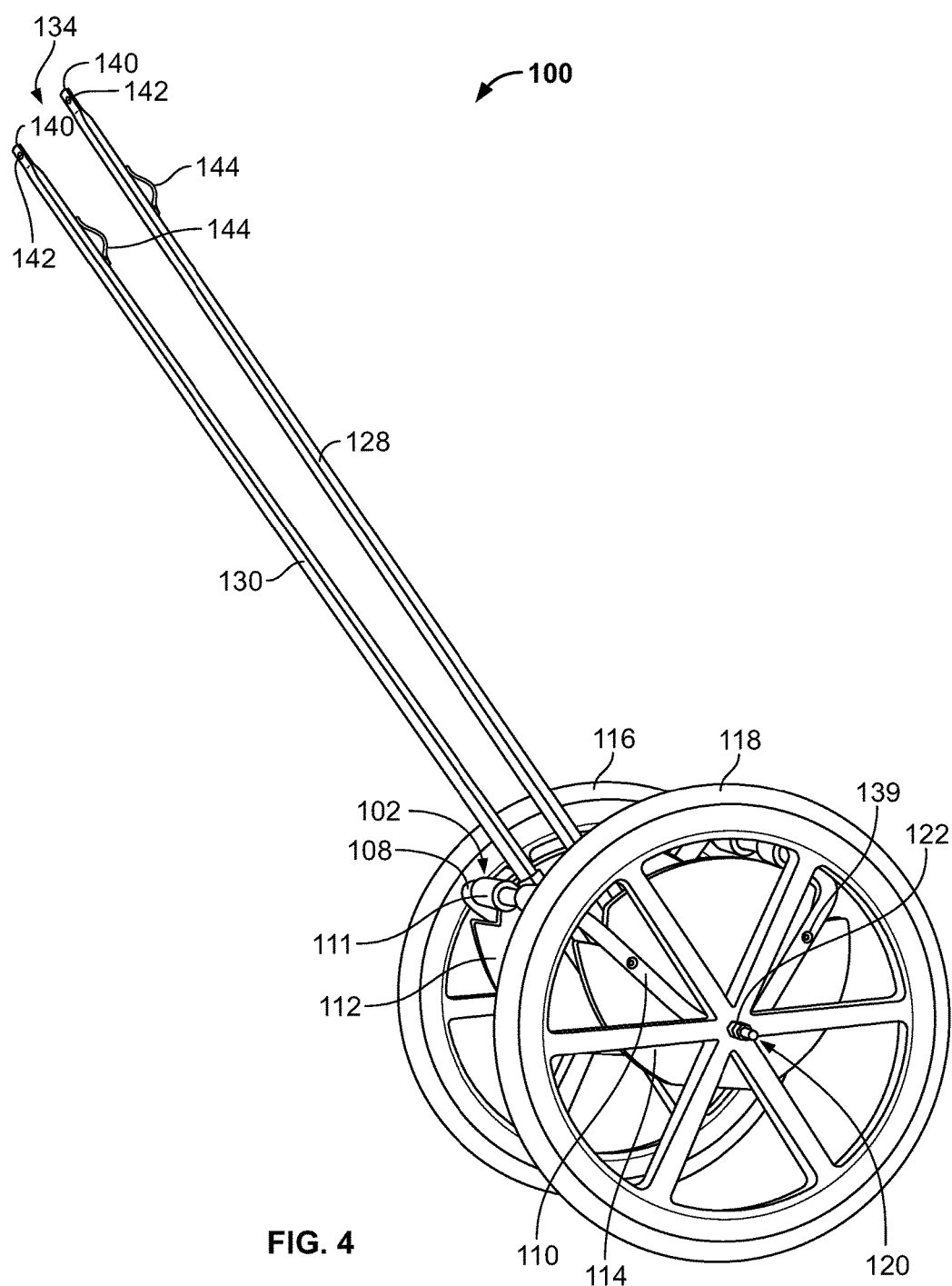
FIG. 4 is a side view of the exemplary expedition cart of FIG. 1.
Figure 5:
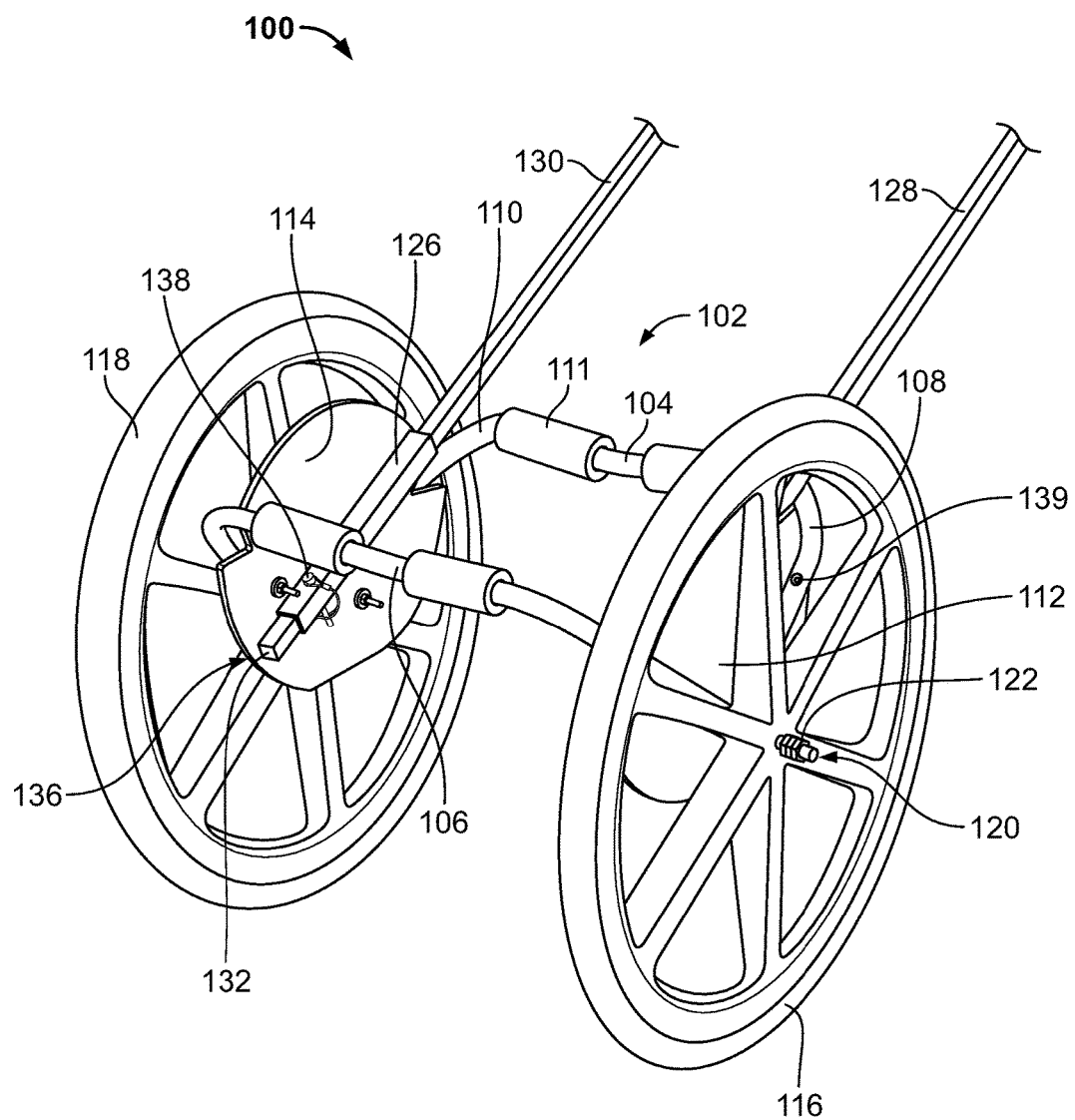
FIG. 5 is a perspective, front view of a chassis of the exemplary expedition cart of FIG. 1.
Figure 6:
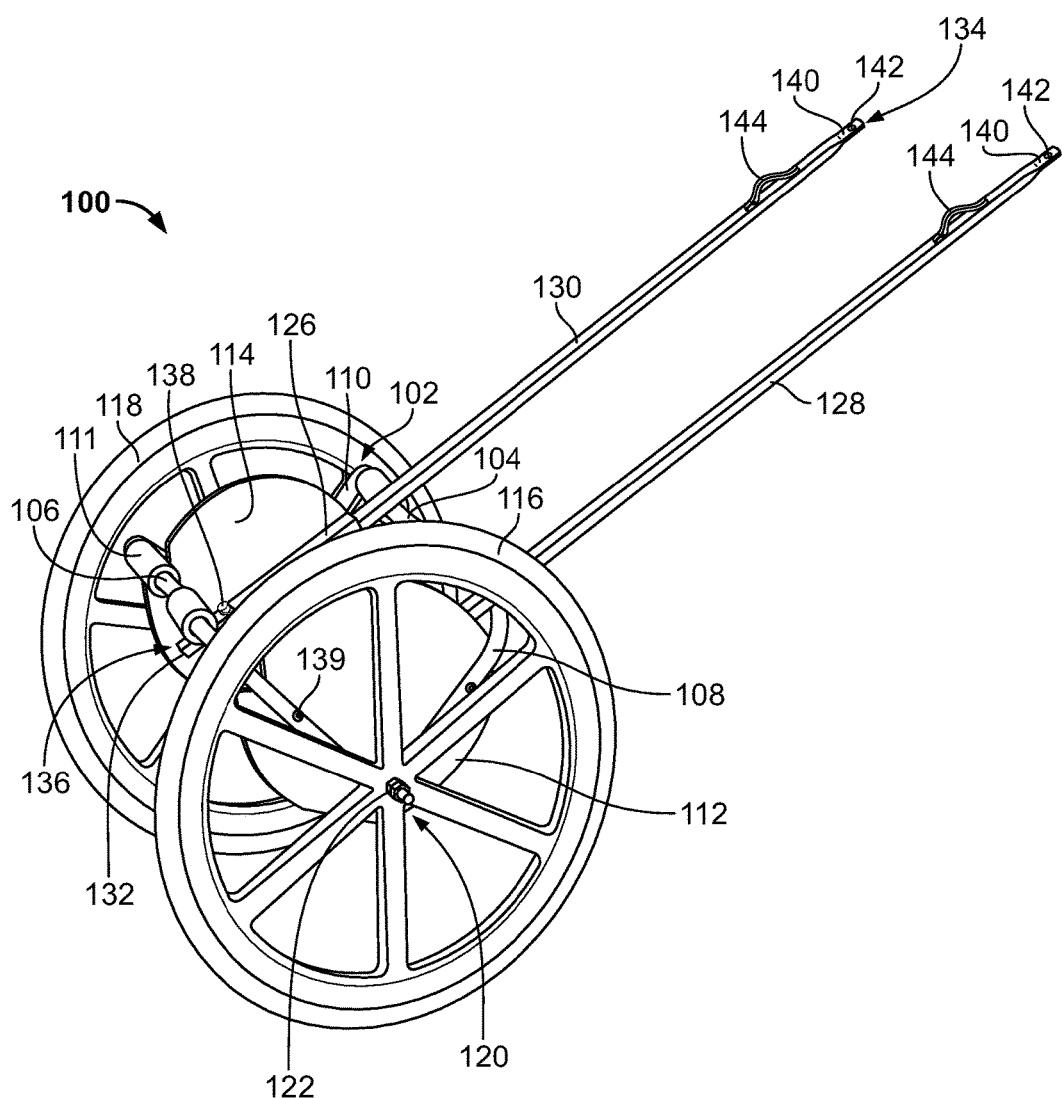
FIG. 6 is a perspective, side view of the exemplary expedition cart of FIG. 1.

With reference to FIGS. 1-8, an exemplary expedition cart 100 is provided that includes a chassis 102, e.g., a frame body, for supporting a load to be carried on the expedition cart 100. The chassis 102 includes a pair of substantially horizontal segments 104, 106 joined together by a pair of side segments 108, 110. In some embodiments, one or both of the horizontal segments 104, 106 can include a bend along the length of the horizontal segments 104, 106. For example, one or both of the horizontal segments 104, 106 can include a bend at a substantially central portion to form a groove into which a load to be carried can be positioned. The bend or curve in the horizontal segments 104, 106 can assist in maintaining a load positioned on the chassis 102 in the desired position. In some embodiments, the horizontal segments 104, 106 can be substantially linear and the load can be maintained on the chassis 102 by implementing attachment means, e.g., pack straps, rope, bungee cables, combinations thereof, and the like.

The side segments 108, 110 can be V-shaped or L-shaped, the endpoints of which join the horizontal segments 104, 106. The side segments 108, 110 thereby create a separation between the horizontal segments 104, 106 which defines the loading deck onto which a load can be positioned. In particular, the horizontal segments 104, 106 act as spreaders which define the width of the expedition cart 100 and represent the entirety of the gear storage surface of the expedition cart 100. For example, a backpack can be positioned on the horizontal segments 104, 106 such that the horizontal segments 104, 106 support the backpack thereon.

In some embodiments, one or both of the horizontal segments 104, 106 can include one or more support elements 111, e.g., foam tubing wrapped around the horizontal segments 104, 106, a rubber coating, and the like. In some embodiments, the support elements 111 can be in the form of a textured surface. The support elements 111 can provide a cushion for the load positioned on the chassis 102, can dampen stresses on the chassis 102, and add a frictional coefficient to reduce the hazard of load slippage.

In some embodiments, the chassis 102 can be fabricated from a high quality aluminum tubing which is bent into the desired shape. In some embodiments, the chassis 102 can be fabricated from a molded carbon fiber, titanium or equivalently strong and lightweight material. For example, titanium can provide the desired rigidity of the chassis 102 and the desired strength to support a heavy load during an expedition. However, it should be understood that alternative materials can be implemented as long as the materials are capable of withstanding loads and stresses associated with transporting supplied in a variety of terrains. For example, materials can be selected based on the type of activity the expedition cart 100 will be implemented for. As an example, an expedition cart 100 to be used in mountain trekking which will require lifting of the expedition cart 100 to cross rivers can be fabricated from lighter materials than an expedition cart 100 to be used for transporting items to a beach. Although illustrated as substantially tubular in cross-section, in some embodiments, the chassis 102 can define a square cross-section.

The expedition cart 100 includes a pair of gusset plates 112, 114 attached to the respective side segments 108, 110. The gusset plates 112, 114 can provide a mounting surface for additional components of the expedition cart 100 and can act to unify and reinforce the chassis 102. In some embodiments, the gusset plates 112, 114 can be patterned and cut from squares of, for example, ¼ inch aluminum flat sheets. However, alternative lightweight materials, e.g., titanium, carbon, and the like, can also be implemented. Although illustrated as substantially circular in shape, in some embodiments, the gusset plates 112, 114 can define, e.g., rectangular, trapezoidal, triangular shapes, and the like.

The gusset plates 112, 114 can be attached to the side segments 108, 110 of the chassis 102 by, e.g., welding or through-bolts for each side segment 108, 110, combinations thereof, and the like. However, alternative connection techniques can be used as viable alternative to mount the gusset plates 112, 114 to the chassis 102. When the expedition cart 100 moves under a load, the gusset plates 112, 114 can distribute forces through the chassis 102, thereby reducing localized stress and eccentric moment events. The gusset plates 112, 114 can provide enhanced load and force distribution, sleeve mounting surfaces, and hub reinforcement. It should be understood that alternative configurations or designs of the gusset plates 112, 114 can be used, e.g., smaller gusset plates 112, 114. In particular, as long as structural integrities are maintained, smaller gusset plates 112, 114 generally relates to a lighter expedition cart 100. In some embodiments, the gusset plates 112, 114 can include one or more openings that function as handholds and/or lashing points (see, e.g., FIG. 22). For example, the opening(s) can function as a handhold to allow the user to grip the gusset plate 112, 114 when handling the expedition cart 100. As a further example, the opening(s) can function as lashing points for passage of straps to secure a load on the chassis 102.

Wheels 116, 118 can be mounted to the chassis 102 at each respective side segment 108, 110. The wheels 116, 118 can be mounted to the side segments 108, 110 with wheel hubs or hub bolts 120. In some embodiments, the nadir of the V-shape or L-shape of the side segments 108, 110 can be flattened such that the side segments 108, 110 can mate relative to a wheel hub. In some embodiments, the nadir of the side segments 108, 110 can remain substantially round in cross-section and a pivot hole can be drilled through the side segments 108, 110 and the gusset plates 112, 114 to receive a hub bolt 120, e.g., an axle. The wheels 116, 118 can be secured to the hub bolt 120 with a locking nut 122. In some embodiments, the wheels 116, 118 can each include a race and bearing assembly such that the wheels 116, 118 rotate via the race and bearing assembly while the hub bolts 120 remain fixed relative to the gusset plates 112, 114.

In some embodiments, as shown in FIG. 1, the expedition cart 100 can include one or more electric generator assemblies 121. In some embodiments, the electric generator assembly 121 can be mechanically coupled to a hub or gusset plate 112, 114 of the expedition cart 100. In some embodiments, the electric generator assembly 121 can be in frictional contact with the wheel(s) 116, 118 of the expedition cart 100. In some embodiments, the electric generator assembly 121 can be mounted to a gusset plate 112, 114. In some embodiments, the electric generator assembly 121 can be mounted to a hub. Each electric generator assembly 121 can include, e.g., an electrical generator (such as a dynamo) and an electrical energy storage (such as a battery). The electric generator assembly 121 can be used to convert the mechanical/rotational motion of the wheel(s) 116, 118 into electrical energy to be stored in the electrical energy storage. The electric generator assembly 121 can include an output source that can connect with a charging cable for a variety of electronic devices, allowing a user to charge electrical equipment (e.g., a mobile device, or the like) from the generated electrical energy.

Although illustrated as substantially perpendicular to the horizontal segments 104, 106, in some embodiments, the side segments 108, 110 can be gradually angled or splayed relative to the horizontal segments 104, 106. For example, the side segments 108, 110 can be positioned closer relative to each other at the points of contact with the horizontal segments 104, 106 and can be angled outwardly by, e.g., approximately three degrees, approximately five degrees, approximately seven degrees, and the like, such that the side segments 108, 110 are positioned further apart relative to each other at the nadir of the side segments 108, 110. The angled or splayed side segments 108, 110 can result in angled or splayed mounting of the wheels 116, 118 relative to the chassis 102. The angled or splayed wheels 116, 118 can provide additional stability for the expedition cart 100 and reduce or prevent instances of the chassis 102 flipping over when the wheels 116, 118 pass over obstacles.

In some embodiments, the wheels 116, 118 can include spokes 116, 118. In some embodiments, the wheels 116, 118 can be spokeless and can include solid tires which are positioned outside of the chassis 102. The hub bolts 120 on which the wheels 116, 118 are mounted can be of a quick release type. The wheels 116, 118 can rotate relative to the hub lots 120 via a race and bearing assembly associated with the wheels 116, 118. The hub bolts 120 can extend through the gusset plate 112, 114, the chassis 102 and the wheel 116, 118. By providing wheels 116, 118 on separate hub bolts 120 (rather than on a single wheel axle), the ground clearance of the expedition cart 100 can be raised substantially above the height of the axis of rotation of the wheels 116, 118.

For example, in some embodiments, the wheels 116, 118 define a diameter of approximately twenty-four inches and an axis of rotation at a height from the ground of approximately twelve inches. However, the load carried on the loading deck defined by the horizontal segments 104, 106 of the chassis 102 can be at a height of approximately nineteen inches, providing the expedition cart 100 with additional ground clearance of approximately seven inches as compared to a cart having a single central wheel axle. The expedition cart 100 can thereby avoid becoming caught on a greater number of ground obstacles, such as small bushes, rocks, branches, and the like. It should be understood that the dimensions of the expedition cart 100 discussed herein, including the width of the horizontal segments 104, 106 and the size of the wheels 116, 118, can be varied while still falling within the intended scope of the invention. For example, in some embodiments, when the expedition cart 100 is disassembled and strapped to a backpack worn by a user, the twenty-four inch wheels 116, 118 can provide sufficient clearance of the backpack, while being positioned adjacent to the back of the user. Although the wheels 116, 118 can be dimensioned to be greater than twenty-four inches, a greater height of the wheels 116, 118 can increase the height of the chassis 102, thereby resulting in risk of less stability of the chassis 102. In such embodiments, stability of the chassis 102 can be increased by, e.g., increasing the splay of the wheels 116, 118 relative to the chassis 102, increasing the width between the wheels 116, 118, combinations thereof, and the like.

The expedition cart 100 further includes a pair of shaft-arm or handle sleeves 124, 126. The sleeves 124, 126 can be fabricated from, e.g., aluminum, carbon, titanium, and the like. The sleeves 124, 126 can be mounted to the gusset plates 112, 114 by welding. For example, the sleeves 124, 126 can be welded to the gusset plates 112, 114 at an angle designed to maintain a level loading deck defined by the horizontal segments 104, 106 while traveling on level ground.

In some embodiments, the sleeves 124, 126 can be pivotally positioned relative to the gusset plates 112, 114 such that the angle of inclination of the sleeves 124, 126 relative to the loading deck of the chassis 102 can be adjusted or customized based on user characteristics, e.g., height, the type of activity the expedition cart 100 is to be used for, and user preferences. For example, the sleeves 124, 126 can be flexibly connected to the gusset plates 112, 114 by center pinning and can include a spring-loaded pin configured to be received in graduated holes formed in the gusset plates 112, 114. In some embodiments, the gusset plates 112, 114 can include a viewable protractor adjacent to the graduated holes to indicate to a user the different angles of inclination relative to the loading deck. The sleeves 124, 126 can thereby be adjusted at the point-of-sale based on user characteristics, user activities, or both, or can be adjusted in the field based on, for example, varying slopes of travel.

The sleeves 124, 126 can be mounted substantially parallel relative to each other. The cross-sectional configuration of the sleeves 124, 126 can be, e.g., square, circular, and the like, and can be configured and dimensioned to receive a respective shaft arm 128, 130, e.g., handle, therein. In some embodiments, the sleeves 124, 126 can define two open ends. In some embodiments, the sleeves 124, 126 can define only one open end configured to receive a portion of the shaft arm 128, 130 and the closed opposing end can assist in retaining the shaft arm 128, 130 secured within the sleeve 124, 126.

As discussed above, the expedition cart 100 includes a pair of shaft arms 128, 130 which define a proximal end 132 and a distal end 134. The shaft arms 128, 130 can be detachably secured to and can extend from the respective sleeves 124, 126. In particular, the proximal end 132 of the shaft arms 128, 130 can be secured to the chassis 102 at the sleeves 124, 126, and the distal end 134 of the shaft arms 128, 130 can be gripped by a user, secured to a belt or harness of a user, or both. The shaft arms 128, 130 length can be calculated to satisfy load overhang, leg stride, waist height, combinations thereof, and the like. Although illustrated as fixed in length, in some embodiments, the shaft arms 128, 130 can be, e.g., customized by user characteristics, customized by user activity, telescoping to allow field adjustments or customization based on varying topographic contours and user characteristics (see, for example, FIG. 10).

The shaft arms 128, 130 can be galvanically compatible, rustproofed, gasketed, primed and/or painted and can be axially reliable. In some embodiments, the shaft arms 128, 130 can be circular in cross-section. In some embodiments, the shaft arms 128, 130 can define a square cross-section. The shaft arms 128, 130 can be fabricated from, e.g., aluminum, titanium, carbon, steel, and the like. In some embodiments, the shaft arms 128, 130 can be filled with a dampening material, e.g., a core rod of acrylonitrile butadiene styrene (ABS) plastic, to absorb and dampen impact stresses. In some embodiments, the shaft arms 128, 130 can include caps 136 on the bottom portion of the proximal end 132 to prevent intrusion of dirt and debris.

In some embodiments, after being inserted into the sleeves 124, 126, the proximal end 132 of the shaft arms 128, 130 can be releasably secured in the sleeves 124, 126 by respective clevis pins 138. For example, the sleeves 124, 126 can include guide holes passing through the width of the sleeves 124, 126 and the shaft arms 128, 130 near the proximal end 132 can include a complementary guide hole passing through the width of the shaft arms 128, 130. The guide holes can be configured and dimensioned to receive a quick release wire lock clevis pin 138. Thus, when the proximal ends 132 of the shaft arms 128, 130 are inserted into the respective sleeves 124, 126, clevis pins 138 can be used to releasably lock the shaft arms 128, 130 within the sleeves 124, 126. In some embodiments, two clevis pins 138 can be used for each shaft arm 128, 130 to ensure a rigid connection between the sleeves 124, 126 and shaft arms 128, 130.

Figure 7:
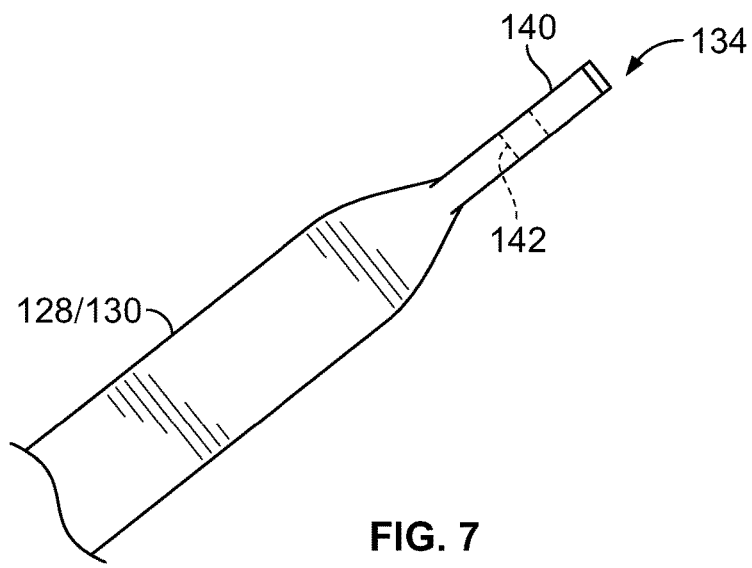
FIG. 7 is a detailed, side view of a handle of the exemplary expedition cart of FIG. 1.
Figure 8:
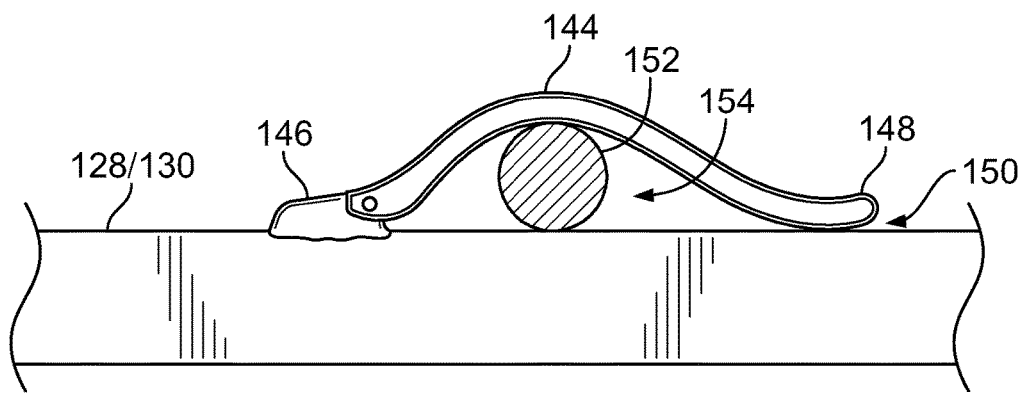
FIG. 8 is a detailed, side view of a handle of the exemplary expedition cart of FIG. 1.
Figure 9:
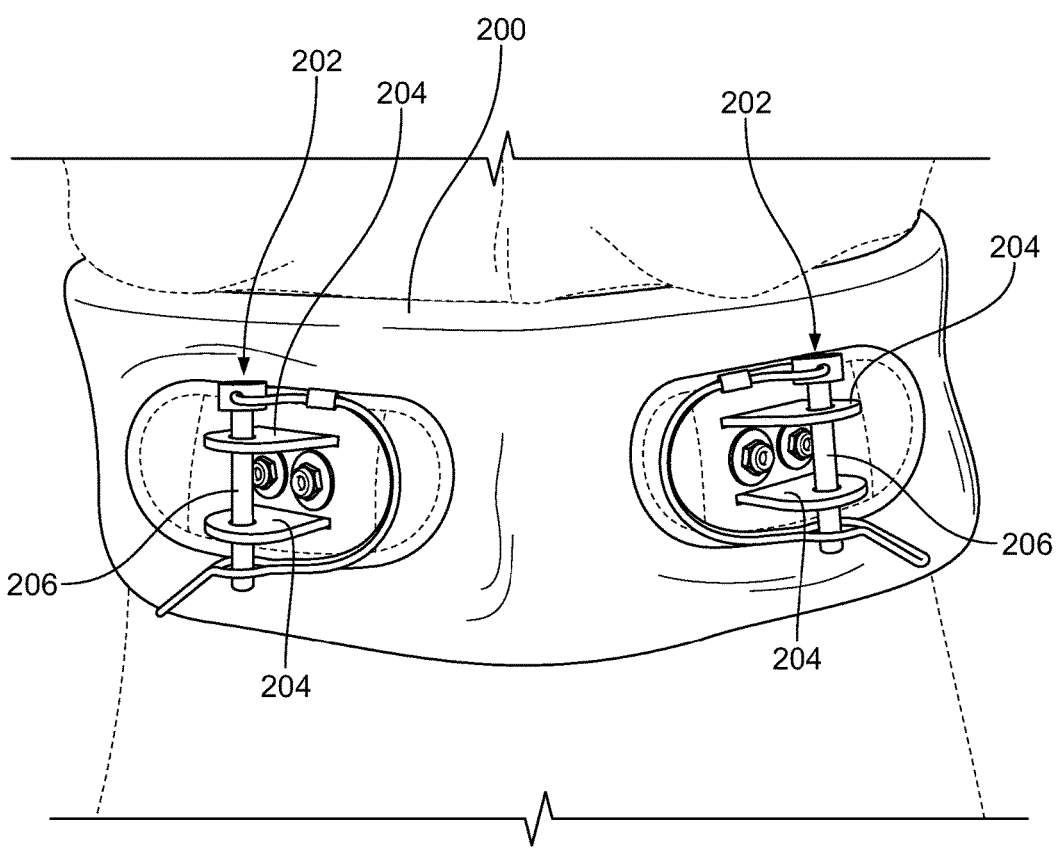
FIG. 9 is a perspective view of an exemplary harness configured to releasably receive a handle of the exemplary expedition cart of FIG. 1.

In some embodiments, the distal end 134 of the shaft arms 128, 130 can include a gripping structure thereon, e.g., a textured surface, a foam cover, a rubber cover, and the like, to provide an area at which the user can grip the shaft arms 128, 130 for pulling the expedition cart 100. With reference to FIG. 7, in some embodiments, a portion of the distal end 134 of the shaft arms 128, 130 can be flattened into a horizontal or vertical paddle 140. For example, a portion of the shaft arms 128, 130 can be peened flat into the flattened paddle 140 configuration. Each of the paddles 140 can include a center boring 142 passing therethrough. The paddle 140 and the boring 142 can be configured and dimensioned to releasably interlock relative to a waist belt or torso/shoulder harness worn by a user (see, for example, FIG. 9). As will be discussed in greater detail below, the flattened paddle 140 can be positioned between two separated flanges including complementary center bores and, for example, respective quick release wire lock clevis pins can be used to secure the shaft arms 128, 130 relative to the belt or harness of a user. Thus, rather than gripping and pulling the expedition cart 100, the expedition cart 100 can be secured to the belt or harness of a user and the user can maintain free hands for alternative purposes.

The exemplary expedition cart 100 discussed herein can also be implemented for pushing a load. In particular, with reference to FIG. 8, each of the arm shafts 128, 130 can include a cross bar bracket 144 secured thereon. The brackets 144 can be secured to a top surface of the arm shafts 128, 130, e.g., a surface facing away from the ground. In some embodiments, the brackets 144 can be secured to a bottom surface of the arm shafts 128, 130, e.g., a surface facing the ground. The brackets 144 can be in the form of a spring clip. A first end 146 of the brackets 144 facing away from the distal end 134 of the arm shafts 128, 130 can be fixedly secured (e.g., welded) to the arm shafts 128, 130 and an opposing second end 148 facing the user can be configured to lift up to create an opening 150. In some embodiments, the first end 146 can include a hinge at which the bracket 144 can pivot. In some embodiments, the first end 146 can be substantially continuous and the spring force within the bracket 144 can allow flexing of the bracket 144. As an example, the second end 148 of each bracket 144 can be lifted to create an opening 150 for passage of an elongated structure 152, e.g., a walking stick, a cross bar, and the like. Upon insertion of the elongated structure 152 under the bracket 144, the bracket 144 can spring back to an unopened positioned and can retain the elongated structure 152 within a substantially complementary region 154 formed between the shaft arms 128, 130 and the bracket 144. A push bar can thereby be formed for pushing the expedition cart 100.

In some embodiments, the elongated structure 152 can also be used to pull the expedition cart 100. In particular, the spring force within the brackets 144 can be sufficiently high to maintain the elongated structure 152 within the region 154 during pulling of the expedition cart 100. In some embodiments, a locking mechanism can be implemented for releasably locking the elongated structure 152 within the region 154.

As discussed above, and with reference to FIG. 9, an exemplary harness 200, e.g., a belt, is provided for releasably interlocking with the expedition cart 100. Although illustrated as worn around the waist of a person, it should be understood that alternative configurations of harnesses can be used with the interlocking mechanisms discussed herein. In particular, the harness 200 includes two interlocking mechanisms 202 horizontally spaced relative to each other. Each of the interlocking mechanisms 202 includes a pair of spaced flanges 204 with a hole passing therethrough. The interlocking mechanisms 202 further include a clevis pin 206, e.g., a wire lock clevis pin 206, configured and dimensioned to pass through the holes of the flanges 204 and releasably interlock relative to the flanges 204. A user can thereby insert the respective flattened paddle 140 portions of the shaft arms 128, 130 in the space formed between the flanges 204 and the clevis pins 206 can be passed through the holes in the flanges 204 and the boring 142 of the flattened paddles 140 to interlock the shaft arms 128, 130 relative to the harness 200. Thus, rather than pulling the expedition cart 100 by gripping the shaft arms 128, 130, the user can pull the expedition cart 100 with the harness 200 while maintaining their hands free for alternative purposes.

Figure 10:
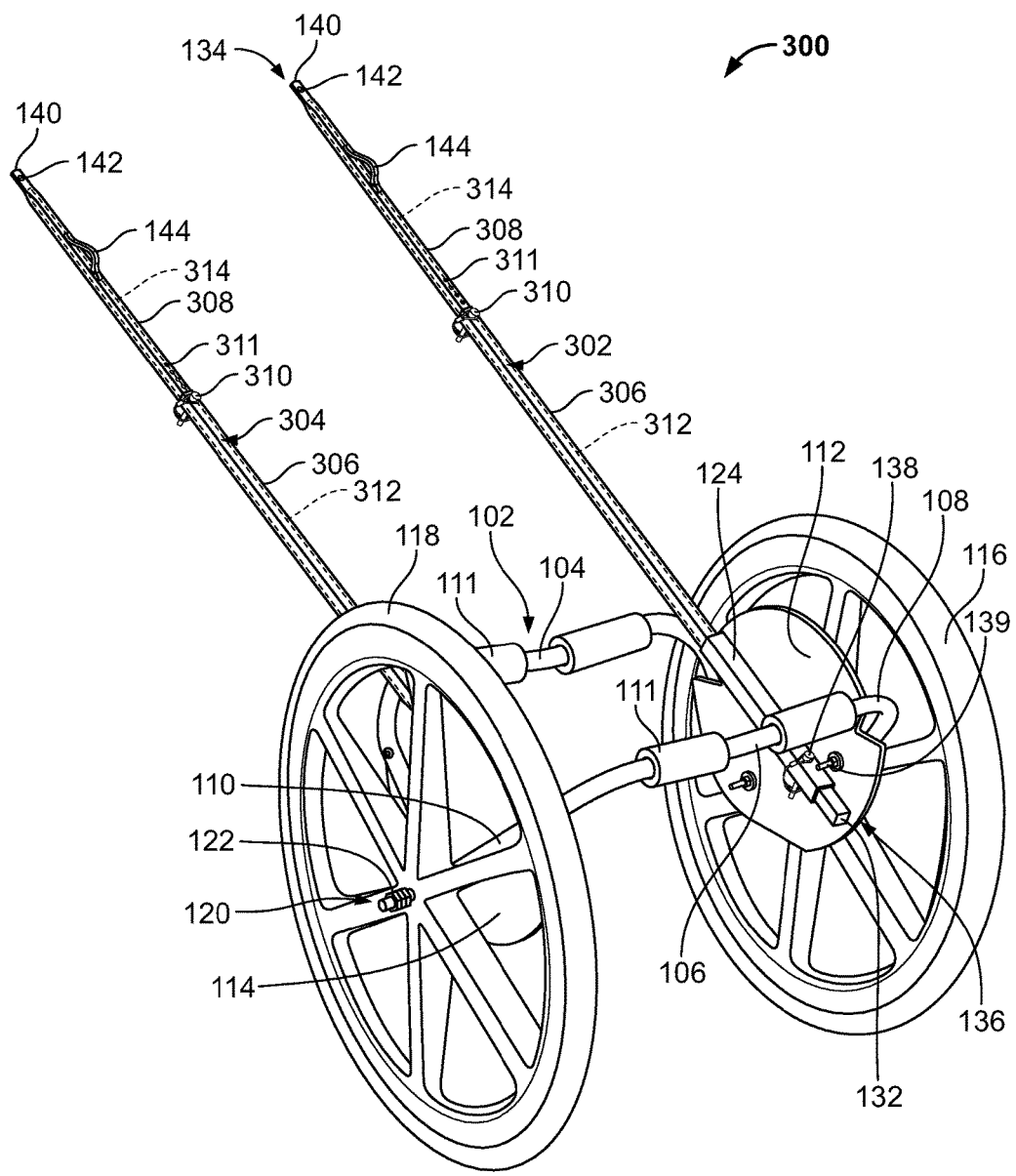
FIG. 10 is a perspective view of an exemplary expedition cart including telescoping handles according to the present disclosure.

With reference to FIG. 10, an alternative expedition cart 300 is provided. In particular, the expedition cart 300 can be substantially similar in structure and function to the expedition cart 100 discussed above, except for the distinctions noted herein. Therefore, similar structures are marked with similar reference numbers.

The expedition cart 300 includes telescoping shaft arms 302, 304. In particular, each shaft arm 302, 304 includes a first shaft arm 306 and a second shaft arm 308, e.g., first and second tubular members, which translate relative to each other. For example, the second shaft arm 308 can translate within the first shaft arm 306 to allow the length of the shaft arms 302, 304 to be adjusted or customized based on, e.g., user characteristics, user activities, user preferences, and the like.

One or more clevis pins 310, e.g., wire lock clevis pins, can be implemented for detachably interlocking the first and second shaft arms 306, 308 relative to each other. For example, the first shaft arm 306 can include a hole passing therethrough configured and dimensioned to receive the clevis pin 310 therethrough. Similarly, the second shaft arm 308 can include a plurality of spaced holes 311 along the length of the second shaft arm 308 for alignment with the hole of the first shaft arm 306 and receipt of the clevis pin 310. Thus, the first shaft arms 306 can be inserted into and interlocked relative to the sleeves 124, 126, and the length of the shaft arms 302, 304 can be adjusted for user preferences by translating the second shaft arm 308 within the first shaft arm 306. In some embodiments, the first shaft arm 306, the second shaft arm 308, or both, can be filled with a dampening material 312, 314, e.g., a core rod of ABS plastic or a similar material, to absorb and dampen impact stresses.

Figure 11:
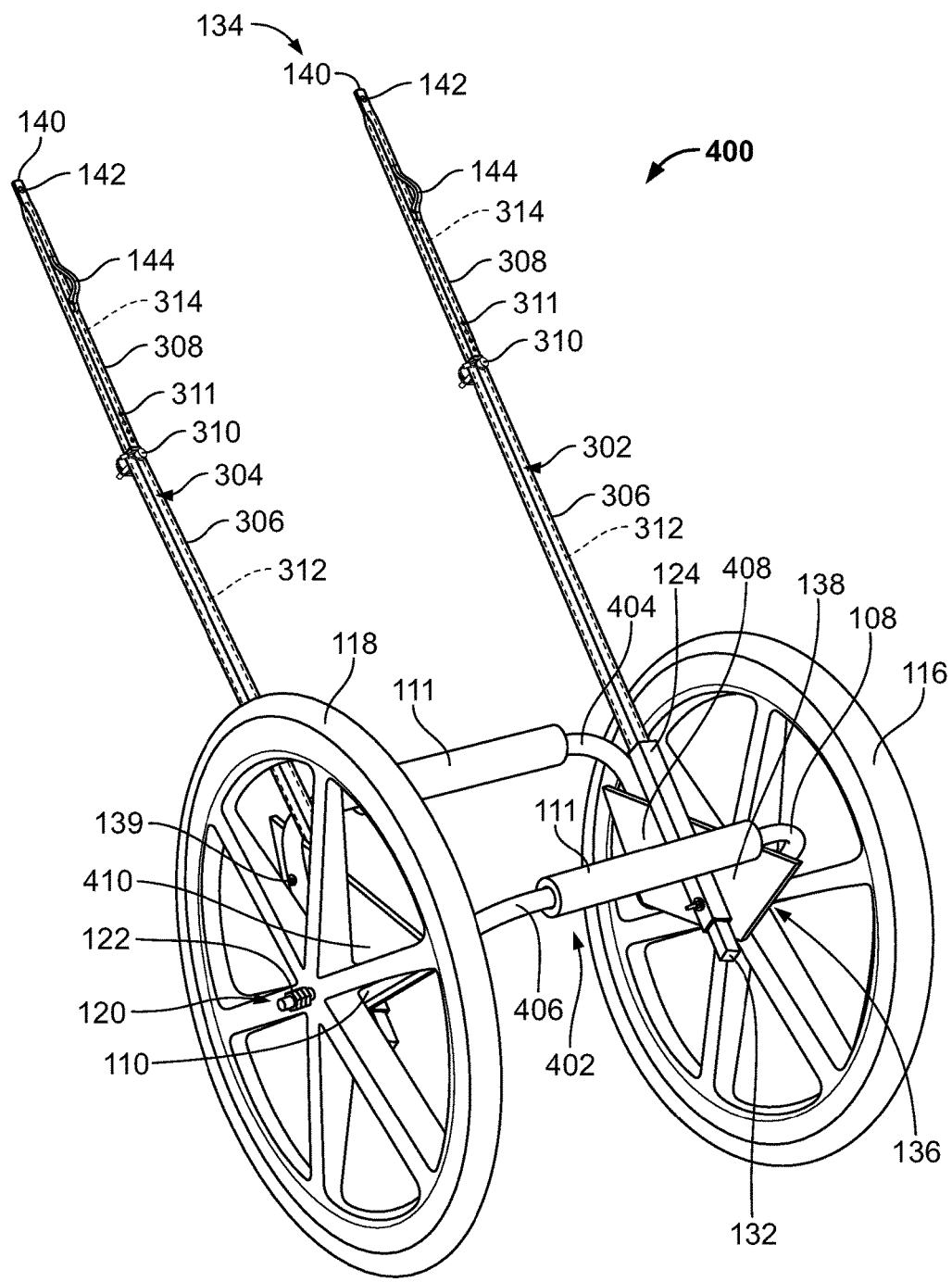
FIG. 11 is a perspective view of an exemplary expedition cart according to the present disclosure.

With reference to FIG. 11, an alternative expedition cart 400 is provided. In particular, the expedition cart 400 can be substantially similar in structure and function to the expedition carts 100, 300 discussed above, except for the distinctions noted herein. Therefore, similar structures are marked with similar reference numbers.

The expedition cart 400 includes a chassis 402 including substantially linear horizontal segments 404, 406. Thus, rather than defining a bend or curve in the horizontal segments 104, 106, the horizontal segments 404, 406 extend linearly between the side segments 108, 110. In addition, the gusset plates 408, 410 of the expedition cart 400 can be substantially trapezoidal in configuration. The trapezoidal configuration allows contact points on both sides of the gusset plates 408, 410 against the side segments 108, 110 and provides sufficient surface area for mounting the sleeves 124, 126. However, the trapezoidal configuration reduces the amount of material for fabrication, thereby reducing the weight of the expedition cart 400.

Figure 12:
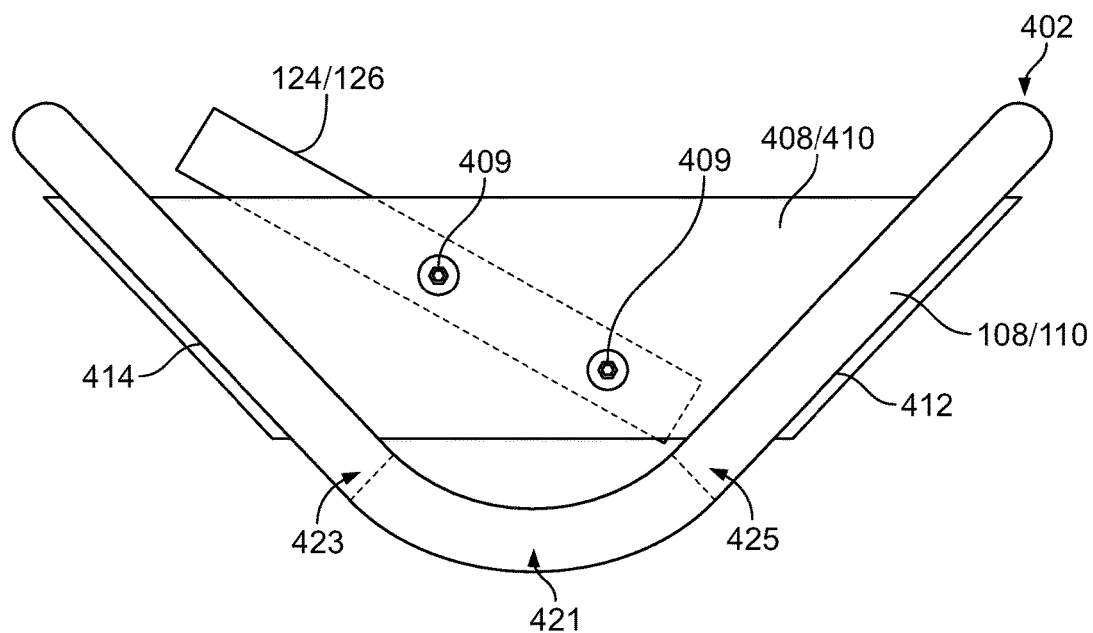
FIG. 12 is a detailed, side view of an exemplary gusset plate and sleeve according to the present disclosure.

With reference to FIG. 12, in some embodiments, the sleeves 124, 126 can be fixedly bolted to the gusset plates 408, 410 based on an angle of the sleeves 124, 126 relative to the loading deck determined during fabrication. For example, the sleeves 124, 126 can be bolted to the gusset plates 408, 410 with two bolts 409 (e.g., recessed bolts). The shaft arms 302, 304 therefore extend from the chassis 402 at a fixed angle. If an adjustment of the orientation of the chassis 402 is desired, the telescoping shaft arms 302, 304 can be implemented to regulate the length of the shaft arms 302, 304 which, in turn, affect the orientation of the chassis 402.

Figure 13:
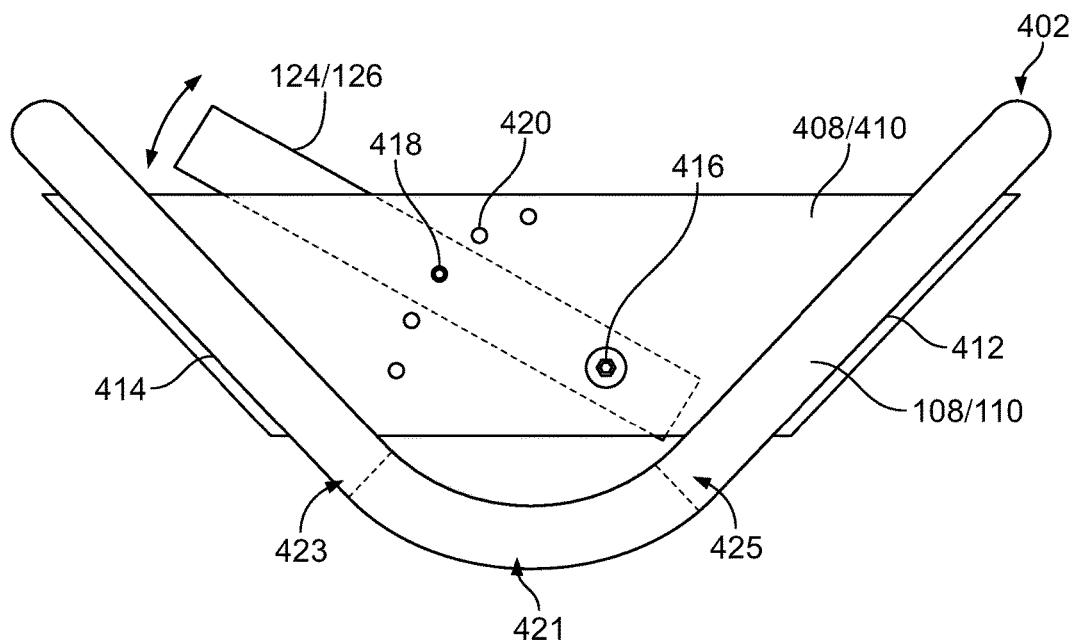
FIG. 13 is a detailed, side view of an exemplary gusset plate and adjustable sleeve according to the present disclosure.

With reference to FIG. 13, in some embodiments, the sleeves 124, 126 can be pivotally secured to the gusset plates 408, 410. In particular, the sleeves 124, 126 can be mounted such that an angle of the sleeves 124, 126 relative to the loading deck can be adjusted or customized by the user to vary the angle at which the shaft arms 302, 304 extend from the chassis 402. For example, the sleeves 124, 126 can include respective pivot points 416, e.g., a recessed axle, rotatably connecting the sleeves 124, 126 to the gusset plates 408, 410. The sleeves 124, 126 can rotate about the pivot points 416 to adjust the angle of inclination of the sleeves 124, 126. Adjustment of the angle of inclination of the sleeves 124, 126 can ensure that the loading deck of the chassis 402 is positioned substantially level to the ground (e.g., to horizontal) during transport on level ground. In particular, based on the angle adjustment, the chassis 402 can be positioned substantially parallel to the ground at all slopes.

Each of the sleeves 124, 126 can include a spring-loaded pin 418, e.g., a locking mechanism, protruding therefrom at a position spaced from the pivot point 416. The spring-loaded pin 418 can be configured and dimensioned to snap into a complementary hole 420 formed in the gusset plates 408, 410. In particular, the gusset plates 408, 410 can include a plurality of holes 420 radially spaced to allow the sleeves 124, 126 to be interlocked at a variety of angles of inclination. In some embodiments, the angle of inclination of the sleeves 124, 126 can be varied within a range of, e.g., approximately fifteen degrees, eighteen degrees, twenty degrees, and the like. To release and rotate the sleeves 124, 126, the spring-loaded pin 418 can be depressed by a user. In some embodiments, the gusset plates 408, 410 can include markings or angles adjacent to the respective holes 420 to indicate to a user the angle of the sleeve 124, 126 relative to the loading deck of the chassis 402. Although illustrated as spring-loaded pins 418, it should be understood that alternative interlocking mechanisms, e.g., a ratcheting mechanism, can be used to releasably secure the sleeves 124, 126 relative to the gusset plates 408, 410.

With reference to FIG. 14, in some embodiments, the side segments 108, 110 of the chassis 402 can be angled or splayed relative to the horizontal segments 104, 106. In particular, the side segments 108, 110 can be angled outward at approximately five degrees such that the side segments 108, 110 are positioned further apart relative to each other at the nadir than at the connecting portions at the horizontal segments 104, 106. The wheels 116, 118 can thereby be mounted to the side segments 108, 110 in an angled or splayed manner to provide greater stability to the expedition cart 400.

With reference to FIG. 15, in some embodiments, the side segments 108, 110 of the chassis 402 can be substantially perpendicular relative to the horizontal segments 104, 106. In particular, the side segments 108, 110 can be substantially parallel relative to each other. The wheels 116, 118 can thereby be mounted to the side segments 108, 110 and relative to each other in a parallel manner.

As noted above, the hub bolt 120 provides mounting of the wheels 116, 118 to the chassis 102 and a race and bearing assembly of the respective wheels 116, 118 allows the wheels 116, 118 to rotate relative to the hub bolt 120. The hub bolt 120 can pass through the respective portions of the chassis 102 and the respective gusset plate 112, 114 for mounting of the wheels 116, 118 to the chassis 102. In such embodiments, a bore passes through the wheels 116, 118, the chassis 102 and the gusset plates 112, 114 for passage of the hub bolt 120 therethrough. As the expedition cart 100, 400 passes over terrain, stress on the hub bolt 120 results in stresses imparted on the bore in the chassis 102 and the gusset plates 112, 114, which can deform the bore over time.

Figure 16:
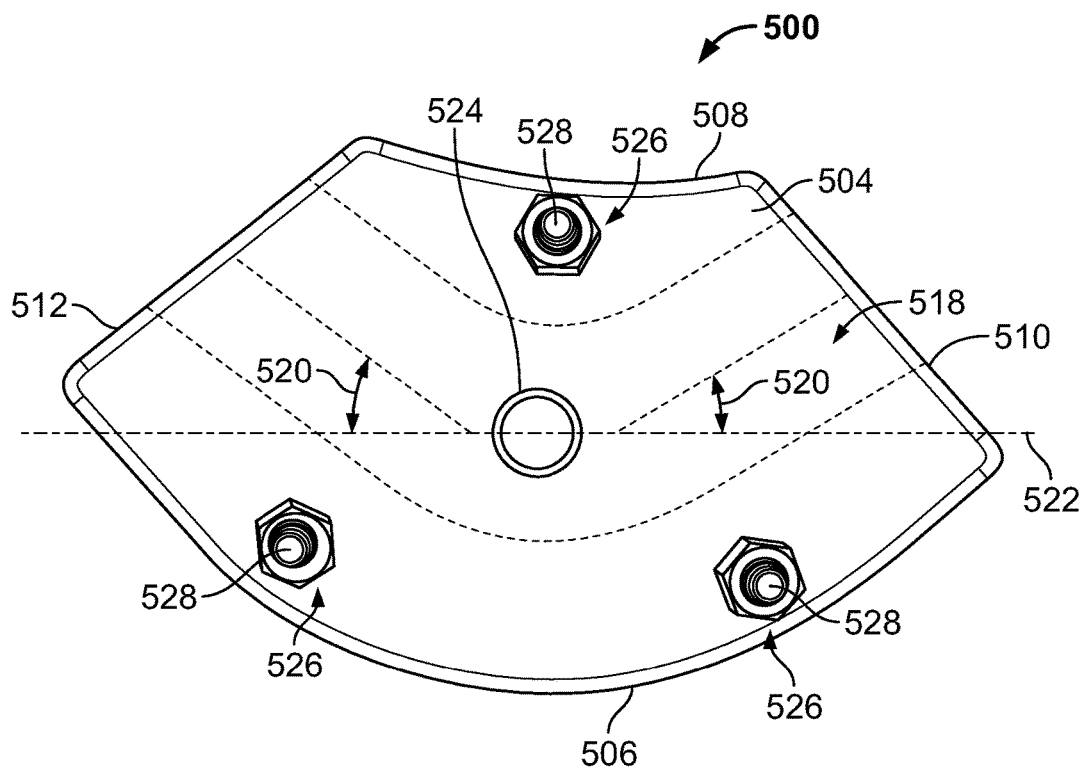
FIG. 16 is a detailed, front view of an exemplary hub according to the present disclosure.
Figure 17:
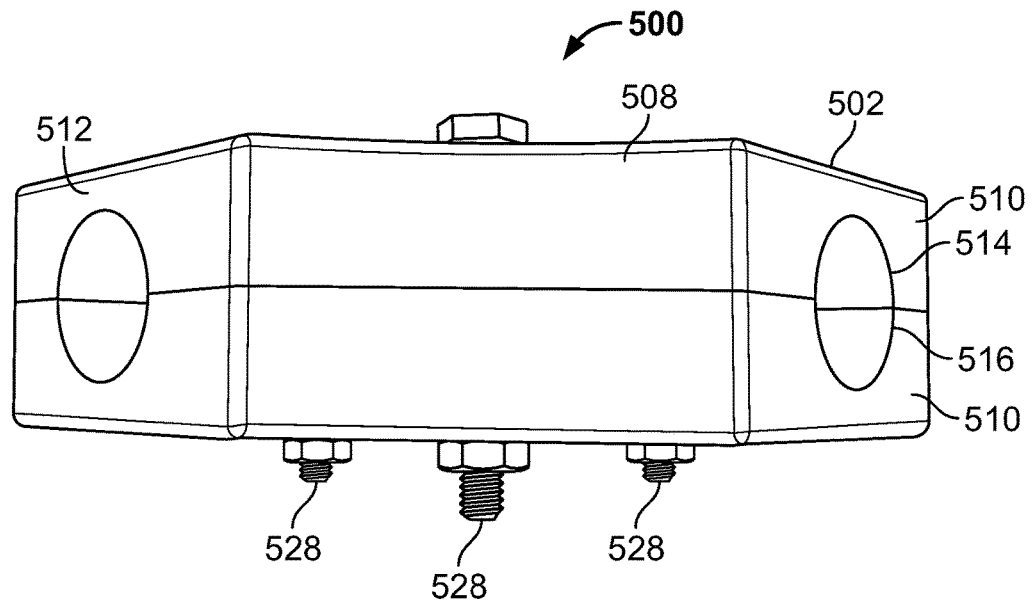
FIG. 17 is a detailed, top view of an exemplary hub of FIG. 16.

In some embodiments, the expedition cart 100, 400 can include a hub secured relative to the chassis 102 to provide additional support to stress imparted on the hub bolt 120. In particular, the hub provides structural support to the hub bolt 120, thereby preventing the bore formed in the chassis 102 and the gusset plates 112, 114 from warping over time. FIGS. 16 and 17 show front and top views of an exemplary hub 500 according to the present disclosure. The hub 500 generally includes a two part design including a first half 502 and a second half 504. As will be discussed in greater detail below, the first and second halves 502, 504 are configured and dimensioned to fit around a valley portion 421 of the chassis 102, 402 (see, e.g., FIGS. 12 and 13).

The first and second halves 502, 504 can be substantially symmetrical and fit together to form the hub 500. The first and second halves 502, 504 each include an outer edge 506 defining a convex surface and an inner edge 508 defining a concave surface. The radius of curvature of the outer edge 506 can be dimensioned smaller than the radius of curvature of the inner edge 508. Thus, the hub 500 can define a substantially U-shaped configuration. In some embodiments, the hub 500 can define a square or rectangular configuration. The outer and inner edges 506, 508 are joined by substantially flat side edges 510, 512.

Each of the first and second halves 502, 504 includes a curved, semicircular passage 514, 516 formed therein and passing therethrough. In particular, the semicircular passages 514, 516 are configured such that when the first and second halves 502, 504 are positioned adjacent to each other, the semicircular passages 514, 516 form a substantially curved, circular passage 518 passing through the hub 500 between the side edges 510, 512. Initially, the passage 518 extends in a direction perpendicular to the respective side edge 510, 512, and curves towards a middle portion of the hub 500 to define a substantially U-shaped or arced configuration. Thus, the openings leading to the passage 518 at each of the side edges 510, 512 extend at an angle 520 (e.g., between approximately 20 degrees and approximately 50 degrees) relative to horizontal 522. It should be understood that the curvature and size of the passage 518 can be complementary to the curvature and configuration of the valley portion 421 of the chassis 102, 402 such that the opposing halves 502, 504 can be positioned around and secured to the valley portion 421 with minimal clearance between the chassis 102, 402 and the inner surface of the passage 518 (e.g., the passage 518 receives the valley portion 421 of the chassis 102, 402).

The hub 500 includes a central bore 524 extending perpendicular to the extension of the passage 518. In particular, the central bore 524 extends through the first and second halves 502, 504 and through the passage 518. The central bore 524 can be configured and dimensioned to receive therethrough the hub bolt 120 (or a similar fixation element). The hub 500 includes three or more fixation bores 526 formed therein and extending through the first and second halves 502, 504. Rather than extending through the passage 518, the fixation bores 526 can extend in a direction perpendicular to the passage 518 and be disposed above and/or below the passage 518. In some embodiments, one fixation bore 526 can be disposed above the passage 518 and aligned with the central bore 524, and two fixation bores 526, 526 can be disposed below the passage 518 and radially offset from the central bore 524. In some embodiments, rather than extending through the hub 500, the fixation bores 526 can extend a partial distance of the width of the hub 500 and can be tapped to receive a fixation element.

The hub 500 can be used with a chassis 102, 402 that defines a single-piece construction (e.g., the chassis defines a continuously formed frame that extends between the wheels 116, 118 and further defines a continuous valley portion 421). In particular, during assembly, the first and second halves 502, 504 can be positioned around the chassis 102, 402 (e.g., wrapped or mated around the valley portion 421) such that the valley portion 421 is received within the passage 518. The preformed curvature of the passage 518 allows for a bore of the chassis 102, 402 to align with the central bore 524 when the first and second halves 502, 504 are disposed around the chassis 102, 402.

Fixation elements 528 (e.g., bolts) can be passed through the fixation bores 526 to secure the first and second halves 502, 504 relative to each other. In some embodiments, the fixation elements 528 can be used to detachably secure the hub 500 to the respective gusset plate 112, 114. The hub bolt 120 can be passed through the respective wheel 116, 118, the central bore 524, the bore of the chassis 102, 402, and a bore in the respective gusset plate 112, 114 to secure the wheel 116, 118 to the hub 500, chassis 102, 402, and gusset plate 112, 114. In some embodiments, spacers can be disposed between the chassis 102, 402 and the gusset plate 112, 114. Thus, rather than the bores in the chassis 102, 402 and the gusset plate 112, 114 supporting the stresses on the wheels 116, 118 during rotation, the hub 500 provides structural support and stability to the hub bolt 120. In particular, the hub 500 distributes the load from the hub bolt 120 to the entire curved mating surface along the passage 518 to prevent warping of the bores in the chassis 102, 402 and gusset plates 112, 114. Therefore, the hub 500 distributes the load from point contact stresses at the hub bolt 120 to surface contact stress along the surfaces of the passage 518 that mate with the chassis 102, 402.

In some embodiments, rather than including a chassis 102, 402 having a single-piece construction, a two-piece construction can be used to allow for more compact storage of the expedition cart 100, 400 in the collapsed configuration. For example, the chassis 102, 402 can be formed by two halves 423, 425 separated at the valley portion 421 (see, e.g., FIGS. 12 and 13). Thus, rather than including a continuous valley portion 421, the two halves 423, 425 can be separated from each other and define endpoints of each of the halves 423, 425.

Figure 18:
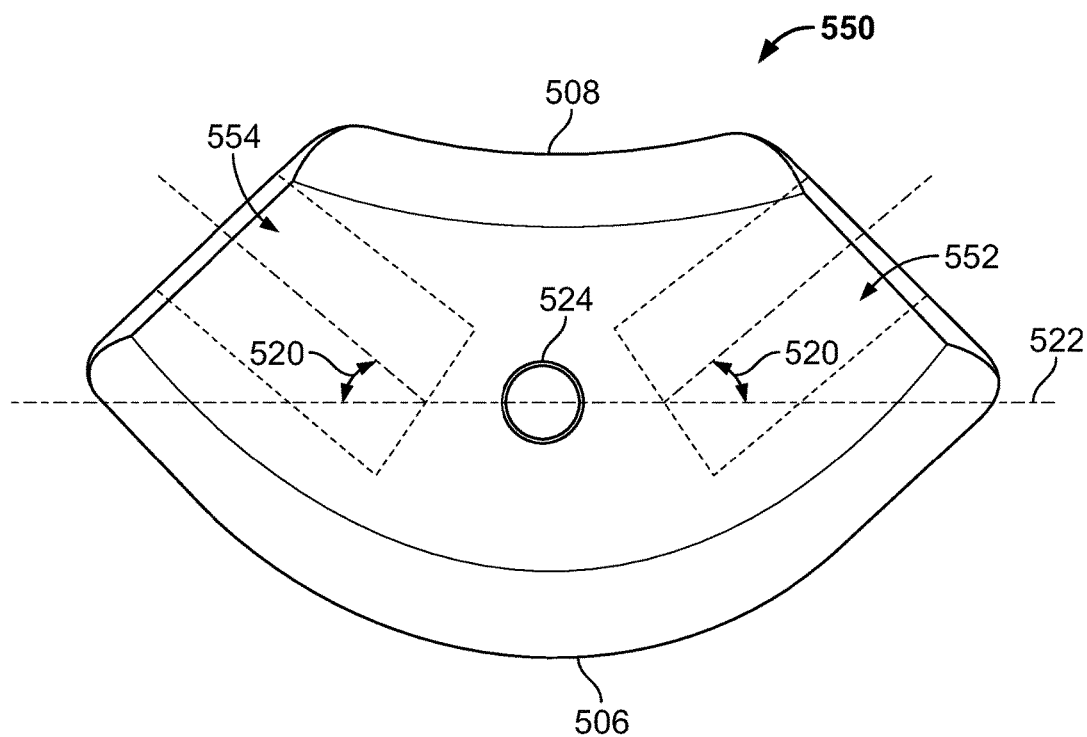
FIG. 18 is a detailed, front view of an exemplary hub according to the present disclosure.
Figure 19:
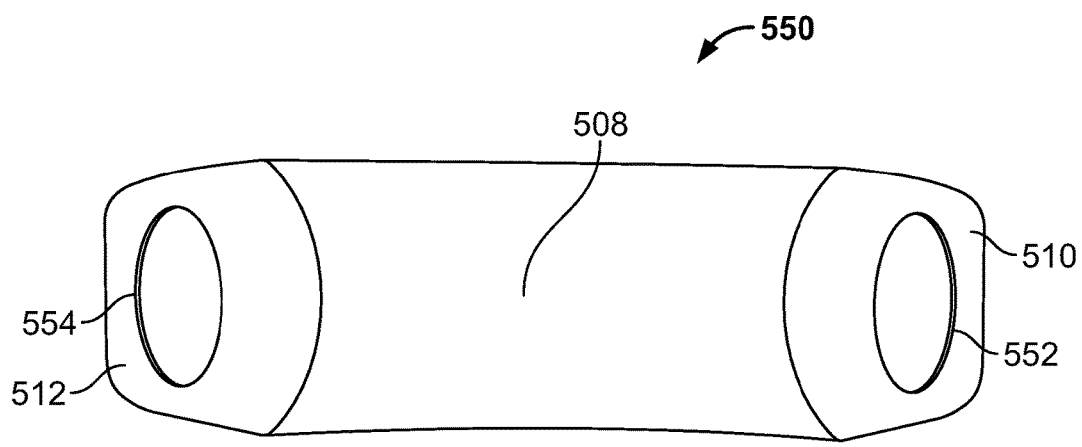
FIG. 19 is a detailed, top view of an exemplary hub of FIG. 18.

FIGS. 18 and 19 show front and top views of an exemplary hub 550 configured and dimensioned to be used with a chassis 102, 402 having a two-piece construction (or a multi-piece construction). The structure and function of the hub 550 can be substantially similar to that of the hub 500, except for the distinctions noted herein. Therefore, like reference numbers are used to represent like structures. The hub 550 can be in the form of a single part design. In particular, rather than including two halves that fit over the valley portion 421 of the chassis 102, 402, the hub 550 can be configured and dimensioned as a single component that receives the end portions of each of the chassis halves 423, 425.

Rather than including two halves with a passage 518 formed by two semicircular passages 514, 516, the hub 550 includes a solid body structure with two passages 552, 554 extending into the hub 550 on opposing sides of the hub 550. In particular, the first passage 552 extends substantially perpendicularly to the side wall 510 in the direction of a central bore 524, thereby being at an angle 520 (e.g., between approximately 20 degrees and approximately 50 degrees) relative to horizontal 522. The second passage 554 extends substantially perpendicularly to the opposing side wall 512 in the direction of the central bore 524, thereby being at an angle 520 relative to horizontal 522. The first and second passages 552, 554 do not connect within the body of the hub 550 and instead remain separated. The hub 550 defines a substantially symmetrical structure along a central vertical axis passing through the central bore 524. The central bore 524 extends through the hub 550 without passing through the first and second passages 552, 554.

Although not shown, in some embodiments, the hub 550 can include fastening bores 526 and fasteners 528 for mounting the hub 550 to the respective gusset plate 112, 114. In some embodiments, the hub 550 can include bores extending perpendicularly through the first and second passages 552, 554 configured to receive fasteners to secure the first and second halves 423, 425 of the chassis 102, 402 relative to the hub 550. Thus, rather than the openings in the chassis 102, 402 and the gusset plate 112, 114 supporting the weight and stress on the wheels 116, 118 during rotation, the hub 550 provides structural support and stability to the hub bolt 120. In particular, the hub 550 distributes the load from the hub bolt 120 to prevent warping of the openings in the chassis 102, 402 and gusset plates 112, 114. Therefore, the hub 550 distributes the load from point contact stresses at the hub bolt 120 to surface contact stress along the surfaces of the passages 552, 554 that mate with the endpoints of the chassis halves 423, 425.

As shown in FIGS. 1 and 11, in some embodiments, the gusset plates 112, 114 can define substantially planar structures configured to be mounted to the chassis 102, 402 with fasteners 139 (e.g., bolts) at two or more points. In such embodiments, although the gusset plates 112, 114 distribute the forces imparted on the chassis 102, 402 to reduce the overall point forces on the chassis 102, 402, the forces may remain focused on the contact points at which the fasteners 139 pass through the gusset plates 112, 114.

Figure 20:
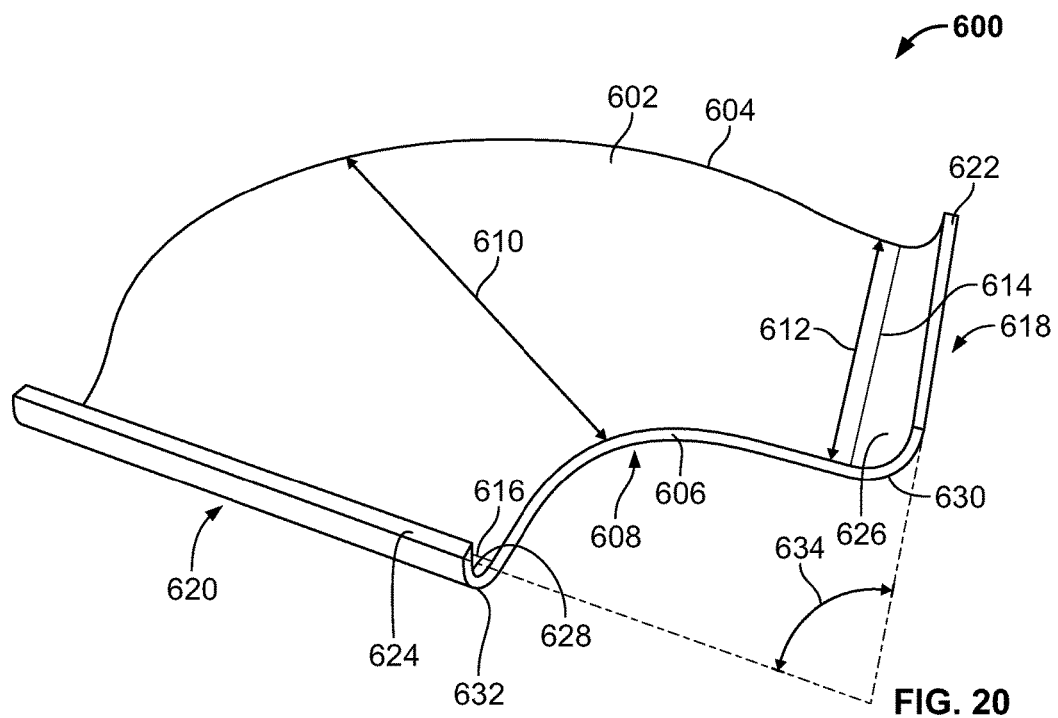
FIG. 20 is a perspective view of an exemplary gusset plate according to the present disclosure.
Figure 21:
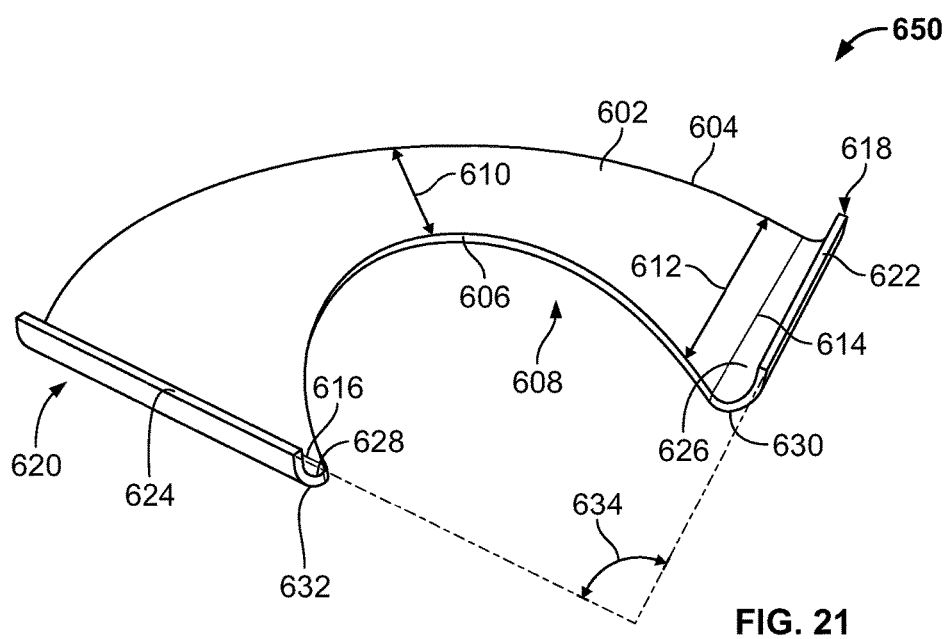
FIG. 21 is a perspective view of an exemplary gusset plate according to the present disclosure.

FIGS. 20 and 21 show perspective views of exemplary gusset plates 600, 650 that are configured and dimensioned to distribute forces imparted on the chassis 102, 402 during use of the expedition cart 100, 400. The gusset plates 600, 650 can be substantially similar in structure and function, except for the distinctions noted herein. It should be understood that the sleeves 124, 126 and/or shaft arms 128, 130 can be mounted to the gusset plates 600, 650 in a substantially similar manner to that described above. Therefore, like reference numbers are used for like structures. The gusset plate 600, 650 includes a central body portion 602 that defines a substantially planar configuration (e.g., a flat, plate defining a thin configuration having a thickness substantially smaller in dimension that the width and height of the plate). In some embodiments, the central body portion 602 includes a top edge 604 (e.g., an outer edge) that defines a convex curvature, and a bottom edge 606 (e.g., an inner edge) that defines a concave curvature. Thus, the central body portion 602 can define a substantially U-shaped configuration. The curvature of the central body portion 602 provides a minimum fender between the load and the wheels 116, 118, provides openings for securing the load to the chassis 102, and provides openings for lifting the expedition cart 100 (e.g., handholds).

The concave curvature of the bottom edge 606 forms a cutout 608 defined by the bottom edge 606. In some embodiments, as shown in FIG. 20, the cutout 608 can be dimensioned such that a central distance 610 between the top and bottom edges 604, 606 is dimensioned greater than a side edge distance 612 between the top and bottom edges 604, 606 (e.g., the radius of curvature of the bottom edge 606 is greater than the radius of curvature of the top edge 604). In some embodiments, as shown in FIG. 21, the cutout 608 can be dimensioned such that the central distance 610 between the top and bottom edges 604, 606 is dimensioned smaller than the side edge distance 612 between the top and bottom edges 604, 606 (e.g., the radius of curvature of the bottom edge 606 is smaller than the radius of curvature of the top edge 604). In some embodiments, the dimensions of the distances 610, 612 can be selected based on a reduction in material to be used for fabrication of the gusset plate 600, 650. For example, the gusset plate 650 is formed from substantially less material than the gusset plate 600, allowing for a reduction in overall weight of the gusset plate 650 and the expedition cart 100, 400.

The central body portion 602 includes side edges 614, 616 that connect the top and bottom edges 604, 606. Each of the side edges 614, 616 includes a curved fastening edge 618, 620 either formed as an extension of the central body portion 602 or secured to the respective side edges 614, 616. The curved fastening edges 618, 620 extend the length of the side edges 614, 616 (e.g., the side edge distance 612) and curve in a direction substantially perpendicular to a plane defined by the central body portion 602. Thus, the planar endpoint 622, 624 of each of the curved fastening edges 618, 620 extends in a direction perpendicular to the extension of the central body portion 602. In addition, due to the curvature of the central body portion 602, the curved fastening edges 618, 620 extend at an angle 634 (e.g., between approximately 70 degrees and approximately 100 degrees, e.g., approximately 90 degrees, or the like) relative to each other. The angle 634 can be substantially complementary to the angled configuration defined by the V-shaped or L-shaped side segments 108, 110 of the chassis 102. Each curved fastening edge 618, 620 includes a curved inner mating surface 626, 628 configured and dimensioned complementary to the chassis 102, 402 (e.g., the rounded surface of the chassis 102, 402). Each curved fastening edge 618, 620 includes an outer surface 630, 632 that defines a rounded edge.

Figure 22:
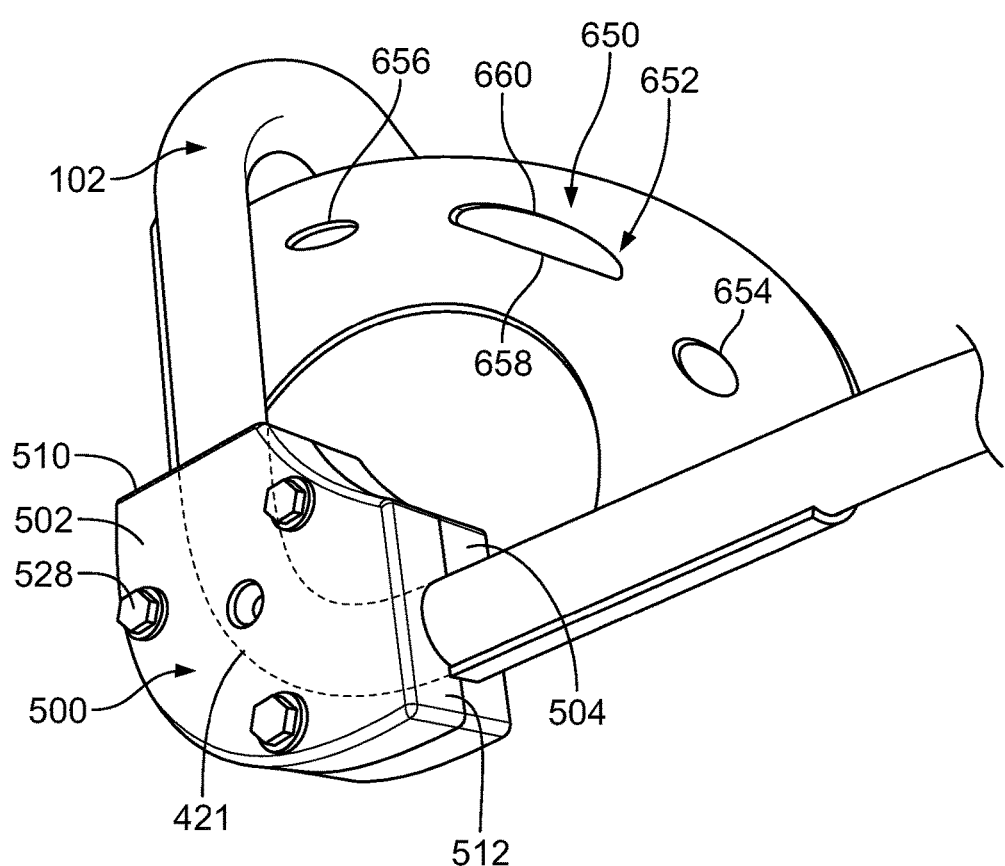
FIG. 22 is a perspective view of an exemplary assembly of a hub, gusset plate and chassis according to the present disclosure.

FIG. 22 shows a perspective view of an assembly including the chassis 102, the hub 500, and the gusset plate 650. It should be understood that the assembly could include a variety of hub and/or gusset plate configurations, such as hub 550 and/or the gusset plate 600. As discussed above, the first and second halves 502, 504 of the hub 500 are disposed or mated around the valley portion 421 of the chassis 102, and the fasteners 528 are used to secure the hub 500 around the valley portion 421 of the chassis 102. The gusset plate 650 can be assembled relative to the chassis 102 by mating the curved fastening edges 618, 620 against the respective portions of the chassis 102 and positioning the ends of the curved fastening edges 618, 620 against the side edges 510, 512 of the first and second halves 502, 504 of the hub 500. In some embodiments, mating the curved fastening edges 618, 620 against the chassis 102 can be in the form of, e.g., positioning the curved fastening edges 618, 620 against the chassis 102, wrapping the curved fastening edges 618, 620 at least partially around the respective portions of the chassis 102, snapping the curved fastening edges 618, 620 at least partially around the respective portions of the chassis 102, or the like.

Mating of the curved fastening edges 618, 620 against the respective portions of the chassis 102 positions the curved inner mating surfaces 626, 628 against the chassis 102 such that continuous contact between the chassis 102 and the inner mating surfaces 626, 628 is formed. Such contact ensures that force applied on the chassis 102 is distributed to the gusset plate 650 along the inner mating surfaces 626, 628 (e.g., contact surface stress distribution versus point contact stress). In some embodiments, fasteners (e.g., bolts) can be used to secure the gusset plate 650 to the chassis 102. In some embodiments, due to the curvature of the curved fastening edges 618, 620, the gusset plate 650 can be maintained in the mating position relative to the chassis 102 without the use of fasteners. Due to the curvature of the curved fastening edges 618, 620 around at least a portion of the respective extensions of the chassis 102, the curved fastening edges 618, 620 reduce or prevent flexing of the chassis 102 sides away from each other when a load is applied on the chassis 102. Thus, the gusset plate 650 provides overall structural support to the chassis 102 during use of the expedition cart 100.

In some embodiments, the gusset plate 650 (or any of the gusset plates discussed herein) can include one or more openings 652, 654, 656 formed therein that can function as handholds and/or lashing points. For example, the opening 652 can define an elongated structure (e.g., approximately four inches or greater) including a linear bottom edge 658 and a rounded top edge 660. The configuration of the opening 652 provides a handhold for handling the expedition cart (e.g., lifting the expedition cart, or the like). In some embodiments, the intersection of the linear bottom edge 658 and the rounded top edge 660 can be, rounded, angled, or the like.

The openings 654, 656 can function as lashing points. For example, straps can be passed through the openings 654, 656 for securing a load on the chassis 102. In some embodiments, the orientation of the openings 654, 656 can be symmetrical on either side of the opening 652. In some embodiments, the orientation of the openings 654, 656 can be asymmetrical relative to the opening 652 (e.g., at different angles) so as not to interfere with the sleeve (not shown) for the shaft arm mounted on the gusset plate 650. In the asymmetrical configuration, it should be understood that the gusset plates 650 on opposing sides of the chassis 102 have mirror images of the openings 654, 656 due to the differing orientation of the sleeves and shaft arms.

The expedition carts discussed herein can substantially reduce the amount of load supported by a user. In particular, the expedition carts reduce the amount of pull force to the horizontal component of the weight of the load, plus the friction component due to the wheels. As an example, the expedition cart can be expected to pull an approximately 100 lb load over most surfaces with less than approximately 20 lbs of pull force. The substantial reduction in support allows the user to travel through a variety of terrains while simultaneously transporting a large amount of supplies.

The expedition carts discussed herein can be fabricated from lightweight, yet rigid, materials, thereby resulting in expedition carts which are extremely light and transportable. If a user encounters severely sloped ascents and descents, is required to carry the expedition cart across a river or over muddy conditions, or desires to transport the expedition cart when it is not in use, the expedition cart can be efficiently disassembled for transport within a short time period. For example, the shaft arms can be separated from the respective sleeves by removing the clevis pins and the shaft arms can be pulled out of the sleeves. If telescoping shaft arms are implemented, the shaft arms can be collapsed into a configuration of minimum length. The remaining assembly of the expedition cart can be carried by hand or mounted/strapped to a pack for transport. As discussed above, the wheels can be dimensioned such that when the expedition cart is strapped to a pack, there is sufficient clearance for the pack and the wheels are positioned adjacent to the back of a user. In particular, the implementation of separate hub bolts (rather than a single axle) allows the wheels to fit around the sides of the pack in a more compact and comfortable carrying position.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An expedition cart, comprising:
   a chassis configured and dimensioned to support a load, and
   a first gusset plate and a second gusset plate attached to the chassis,
   wherein each of the first and second gusset plates includes a central body portion and curved fastening edges on either side of the central body portion,
   wherein the curved fastening edges are configured and dimensioned to snap around and mate against at least a portion of the chassis.

2. The expedition cart according to claim 1, wherein the central body portion defines a planar configuration.

3. The expedition cart according to claim 1, wherein the curved fastening edges extend perpendicularly relative to a plane defined by the central body portion.

4. The expedition cart according to claim 1, wherein the curved fastening edges include curved inner mating surfaces configured complementary to the chassis.

5. The expedition cart according to claim 1, wherein snapping around at least a portion of the chassis distributes forces imparted on the chassis to the first and second gusset plates.

6. The expedition cart according to claim 1, comprising a hub secured to a valley portion of the chassis.

7. The expedition cart according to claim 6, wherein the hub defines a two part design including a first half and a second half configured to be positioned around respective sides of the valley portion of the chassis.

8. The expedition cart according to claim 7, wherein the first and second halves of the hub include a semicircular passage extending between side edges of the first and second halves, the semicircular passage being configured and dimensioned to receive respective halves of the valley portion of the chassis.

9. The expedition cart according to claim 8, comprising a central bore extending perpendicularly relative to the semicircular passage, and extending through the semicircular passage of the first and second halves.

10. The expedition cart according to claim 6, wherein the hub defines a single part design including a body with two separate passages at opposing sides of the body.

11. The expedition cart according to claim 10, wherein the two separate passages are configured and dimensioned to receive endpoints of respective first and second halves of the chassis.

12. The expedition cart according to claim 6, comprising a central bore extending perpendicularly relative to the two separate passages without extending through the two separate passages.

13. An expedition cart, comprising:
    a chassis configured and dimensioned to support a load, and
    a first hub and a second hub engaged with the chassis,
    wherein each of the first and second hubs includes a first half and a second half configured to be positioned around respective sides of the chassis.

14. The expedition cart according to claim 13, wherein the first and second hub each define a two part design.

15. The expedition cart according to claim 13, wherein the first and second halves of each of the first and second hubs include a semicircular passage extending between side edges of the first and second halves, the semicircular passage being configured and dimensioned to receive respective halves of the chassis.

16. The expedition cart according to claim 15, wherein each of the first and second hubs include a central bore extending perpendicularly relative to the semicircular passage, and extending through the semicircular passage of the first and second halves.

17. An expedition cart, comprising:
a chassis configured and dimensioned to support a load, and
a first hub and a second hub engaged with the chassis, wherein each of the first hub and the second hub includes a body with two separate passages at opposing sides of the body, the two separate passages being configured and dimensioned to receive endpoints of respective first and second halves of the chassis.

18. The expedition cart according to claim 17, wherein the hub defines a single part design.

19. The expedition cart according to claim 17, wherein each of the first and second hubs include a central bore extending through the hub perpendicularly relative to the two separate passages without extending through the two separate passages.

20. The expedition cart according to claim 17, wherein the two separate passages extend at an angle greater than zero degrees relative to horizontal.

21. An expedition cart, comprising:
a chassis configured and dimensioned to support a load, and
a first gusset plate and a second gusset plate attached to the chassis, each of the first and second gusset plates including a central body portion and curved fastening edges on either side of the central body portion,
wherein the curved fastening edges extend at an angle relative to each other, and
wherein the curved fastening edges are configured and dimensioned to mate against at least a portion of the chassis.

* * * * *